United States Patent
Saito et al.

(10) Patent No.: US 6,577,072 B2
(45) Date of Patent: Jun. 10, 2003

(54) POWER SUPPLY AND LED LAMP DEVICE

(75) Inventors: Yutaka Saito, Tokyo (JP); Kouei Ozaki, Tokyo (JP); Toshiaki Narukawa, Tokyo (JP); Tsutomu Ota, Uji (JP)

(73) Assignee: Takion Co., Ltd., Tokyo (JP)

( * ) Notice: Subject to any disclaimer, the term of this patent is extended or adjusted under 35 U.S.C. 154(b) by 0 days.

(21) Appl. No.: 09/869,997

(22) PCT Filed: Dec. 14, 2000

(86) PCT No.: PCT/JP00/08838
§ 371 (c)(1),
(2), (4) Date: Jul. 10, 2001

(87) PCT Pub. No.: WO01/45470
PCT Pub. Date: Jun. 21, 2001

(65) Prior Publication Data
US 2002/0158590 A1 Oct. 31, 2002

(30) Foreign Application Priority Data
Dec. 14, 1999 (JP) .......................... 11-354229

(51) Int. Cl.$^7$ .............................................. H05B 37/00
(52) U.S. Cl. .................. 315/185 R; 315/216; 315/193; 315/322; 363/88; 363/126
(58) Field of Search ............... 315/185 S, 185 R, 315/193, 271, 272, 216, 294, 312, 322, 200 R; 362/227, 251, 252, 800, 806, 812; 363/88, 89, 80, 126

(56) References Cited

U.S. PATENT DOCUMENTS

| | | | |
|---|---|---|---|
| 4,173,035 A | * 10/1979 | Hoyt | 361/749 |
| 4,254,451 A | * 3/1981 | Cochran, Jr. | 315/323 |
| 5,321,593 A | * 6/1994 | Moates | 362/227 |
| 5,495,147 A | * 2/1996 | Lanzisera | 315/185 S |
| 5,661,645 A | * 8/1997 | Hochstein | 363/89 |
| 5,793,163 A | * 8/1998 | Okuda | 315/169.2 |
| 5,939,839 A | * 8/1999 | Robel et al. | 315/289 |
| 6,072,280 A | * 6/2000 | Allen | 315/185 S |
| 6,320,330 B1 | * 11/2001 | Haavisto et al. | 315/209 R |
| 6,371,637 B1 | * 4/2002 | Atchinson et al. | 362/249 |

FOREIGN PATENT DOCUMENTS

| | | |
|---|---|---|
| FR | 2 631 102 | 11/1989 |
| JP | 54-152987 | 12/1979 |
| JP | 60-054483 | 3/1985 |
| JP | 62-147366 | 9/1987 |
| JP | 6-62558 | 9/1993 |
| JP | 6-029575 | 2/1994 |
| JP | 7-273371 | 10/1995 |
| JP | 9-074224 | 3/1997 |
| JP | 9-097925 | 4/1997 |
| JP | 1-067471 | 3/1999 |
| JP | 11-097747 | 4/1999 |

* cited by examiner

*Primary Examiner*—Haissa Philogene
(74) *Attorney, Agent, or Firm*—Wenderoth, Lind & Ponack, L.L.P.

(57) ABSTRACT

An LED lamp device of the invention includes a power supply unit (102, 103) supplied with an alternating-current power supply voltage, and an LED lamp (106) constituted by one or a plurality of serially connected LEDs connected to output terminals of the power supply unit (102, 103). The power supply unit (102) obtains a rectified wave of the alternating-current power supply voltage, admits electric power for only part of a time period in which the voltage of the rectified wave corresponding to each half period of the wave of the alternating-current power supply voltage is higher than or equal to a predetermined value, and uses the electric power as power for lighting the LED lamp (106).

25 Claims, 19 Drawing Sheets

FIG. 16
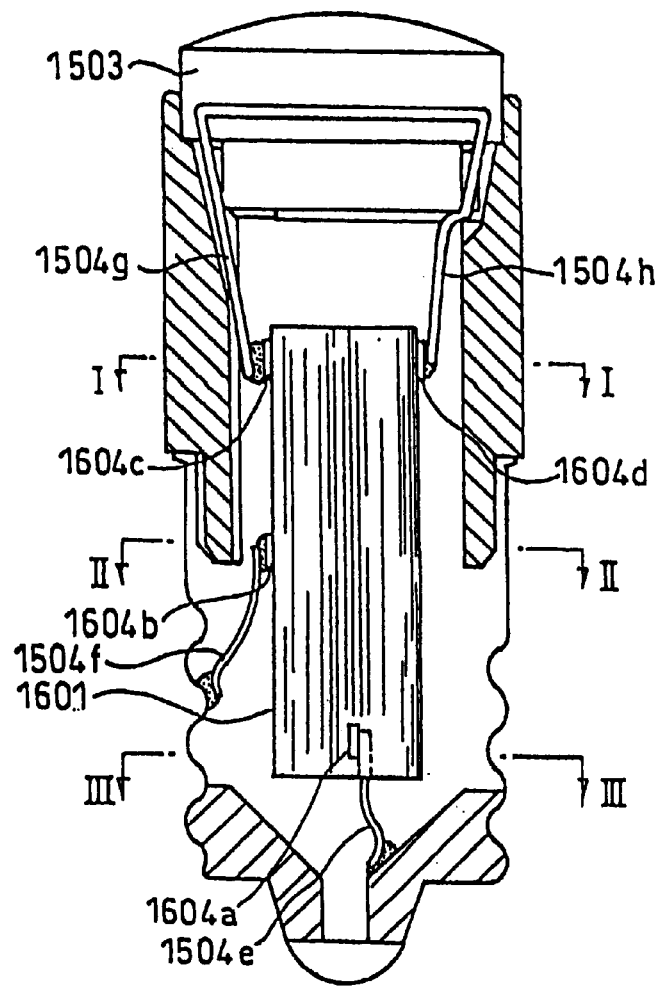
FIG. 17
SECTION I-I 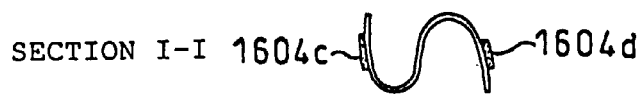
SECTION II-II 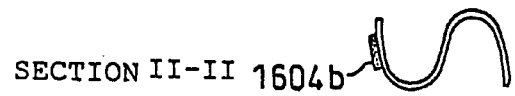
SECTION III-III 

FIG. 18
SECTION I-I 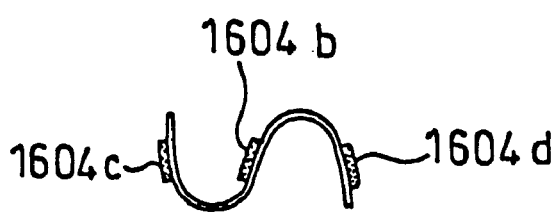
SECTION II-II 
SECTION III-III 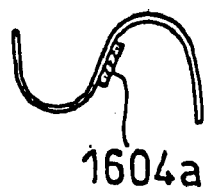
FIG. 19
SECTION I-I 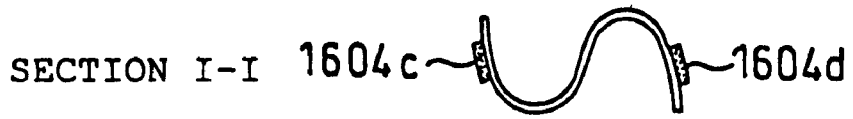
SECTION II-II 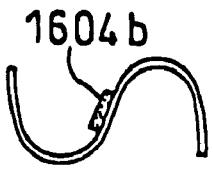
SECTION III-III 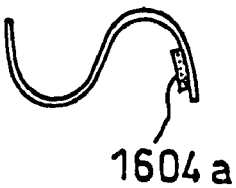

POWER SUPPLY AND LED LAMP DEVICE

TECHNICAL FIELD

The present invention relates to a lamp device using LEDs (Light Emitting Diodes) for purposes of indication or illumination, and more particularly, to an LED lamp device which can be directly connected (directly coupled) to an alternating-current power supply.

BACKGROUND ART

Incandescent lamps using a tungsten filament are still popular for use as various indicator lamps installed in buildings for offices, condominiums, public facilities, etc., such as fire hydrant lamps or emergency lamps, and also as operation button lamps of ticket vending machines and other vending machines, elevators, etc. Further, not a few interior lighting fixtures still use incandescent lamps depending on their purposes.

With the recent advance of semiconductor device technology, LEDs have come to have performance superior to that of incandescent lamps, in terms of the diversity of luminescent color, luminance, durability, and power consumption (luminous efficacy). Nevertheless, at present LEDs are scarcely used for the aforementioned purposes.

This is because lamps for indication or illumination purposes are usually put to use on condition that they are directly connected to commercial alternating-current power supply (100 V in Japan, 110 V in the United States, 230 V in Europe).

Namely, as is generally known, an LED operates with several volts of direct-current (DC) power supply voltage. Thus, in order to use conventional LEDs for the above purposes, it is necessary that a special power supply unit be provided to convert the commercial alternating-current power to several volts of DC voltage, but this makes the LED lamp device expensive and increases the overall size.

Despite these shortcomings, attempts have conventionally been made to connect LEDs directly to the commercial alternating-current power supply, as explained below with reference to the drawings.

FIG. 23 is a circuit diagram showing an LED lamp device of Conventional Type 1.

In FIG. 23, reference numeral 2003 denotes an AC input terminal H (HOT LINE), 2004 denotes another AC input terminal C (COOL LINE), 2002 denotes a full-wave rectifying diode bridge (BrD1), 2005 denotes a series resistor (Rp), 2006 denotes a constant-current element (CRD: Current Regulated Diode), and 2007 denotes an LED lamp.

The LED lamp 2007 usually comprises two to eight serially connected LEDs each having a $V_F$ value (forward voltage drop) of about 2 V, and accordingly, a total $V_F$ value is 4 to 16 V. The peak voltage of the fully rectified wave supplied from the diode bridge 2002 is approximately 140 V in the case of the commercial power supply in Japan whose root-mean-square value is 100 V.

Provided that an $I_F$ value (forward current) of the LED lamp for attaining the required luminance is about 10 mA and that the LED lamp is constituted by one LED, the voltage borne by the resistor 2005 and the constant-current element 2006 is: 140 V−2 V=138 V, since $V_F$ is 2 V, and 138 V×10 mA=1.38 W is consumed by heat dissipation.

The electric power that contributes to light generation is: 2 V×10 mA=0.02 W, and the luminous efficacy is:

$$0.02W/(1.38W+0.02W)=0.014$$

Thus, the luminous efficacy is as low as 1.4%, showing that nearly 99% of the electric power is lost by heat dissipation.

FIG. 24 is a circuit diagram showing an LED lamp device of Conventional Type 2.

In FIG. 24, reference numeral 2105 denotes a voltage regulator (Vreg1), and 2106 denotes a current-limiting resistor (Rc). Also in FIG. 24, identical reference numerals are used to denote elements identical with or equivalent to those appearing in FIG. 23.

In Conventional Type 2, variations in voltage of the fully rectified AC wave are balanced by the voltage regulator 2105; therefore, the constant-current element CRD used in the aforementioned Conventional Type 1 can be omitted and also the light generation is stabilized. However, the efficiency of electric power utilization is basically the same as (as low as) the aforementioned Conventional Type 1, because of the series regulation of voltage.

As described above, the conventional devices are low in efficiency and high in loss, and thus there has been a demand for a device improved in these respects.

An object of the present invention is therefore to provide a power supply unit and an LED lamp device which are high in efficiency and low in loss.

DISCLOSURE OF THE INVENTION

To achieve the above object, a power supply unit according to a first aspect of the invention comprises: wave rectifier operable to obtain a rectified wave of an alternating-current power supply voltage; and an electric power output operable to admit electric power for only part of a time period in which a voltage of the rectified wave obtained by the wave rectifier and corresponding to each half period of a wave of the alternating-current power supply voltage is higher than or equal to a predetermined value, and to output the electric power as power for driving a load.

A power supply unit according to a second aspect of the invention comprises: a rectifying diode bridge operable to obtain a rectified wave of a power supply voltage; an oscillator circuit; a clock signal control circuit; and a switched capacitor step-down circuit including a plurality of changeover switches connected in series and capable of being switched between two positions, and a capacitor connected between adjacent ones of the changeover switches, wherein the changeover switches are switched to either of the two positions by the clock signal control circuit such that the capacitors are charged when the changeover switches are in one of the two positions and that the capacitors are discharged when the changeover switches are in the other of the two positions, thereby supplying electric power to a load.

A power supply unit according to a third aspect of the invention has two input terminals connected to an alternating-current power supply, for supplying electric power to a load connected to output terminals thereof. The power supply unit of this aspect comprises: an oscillator circuit; a clock signal control circuit; a current detection circuit; and two switched capacitor step-down circuits, wherein a high voltage-side input terminal of one of the two switched capacitor step-down circuits and a low voltage-side input terminal of the other switched capacitor step-down circuit are connected to one of the two input terminals of the power supply unit, and a low voltage-side input terminal of said one switched capacitor step-down circuit and a high voltage-side input terminal of the other switched capacitor step-down circuit are connected to the other of the two input terminals power supply unit.

An LED lamp device according to a fourth aspect of the invention comprises: a power supply unit supplied with an alternating-current power supply voltage; and an LED lamp including one or a plurality of serially connected LEDs connected to output terminals of the power supply unit, wherein the power supply unit obtains a rectified wave of the alternating-current power supply voltage, admits electric power for only part of a time period in which a voltage of the rectified wave corresponding to each half period of a wave of the alternating-current power supply voltage is higher than or equal to a predetermined value, and uses the electric power as power for lighting the LED lamp.

Preferably, in the LED lamp device according to the fourth aspect of the invention, the power supply unit includes a rectifying diode bridge and a Zener diode serving as a constant-voltage element and connected in series with the rectifying diode bridge, wherein the diode bridge rectifies the input voltage and then the Zener diode admits the electric power for only the time period in which the rectified voltage is higher than or equal to the predetermined value, to light the LED lamp.

An LED lamp device according to a fifth aspect of the invention comprises: a power supply unit supplied with alternating-current or direct-current power; and an LED lamp including one or a plurality of serially connected LEDs connected to output terminals of the power supply unit, wherein a Zener diode is connected in parallel with the one or plurality of LEDs.

Preferably, in the LED lamp device according to the fifth aspect of the invention, where the LED lamp comprises a plurality of LED lamps, a constant-current element is connected to the output terminals of the power supply unit in series with the LED lamps. With this arrangement, even in the event any of the LED lamps burns out and thus turns off, the remaining LED lamps can remain on.

Also preferably, in the LED lamp device according to the fifth aspect of the invention, the Zener diode has a Zener voltage higher than a forward voltage drop of the LED lamp connected in parallel with the Zener diode within a range of from 10% to 30% both inclusive. If the difference between the Zener voltage and the forward voltage drop is smaller than 10%, dimming cannot be effectively prevented, and if the difference is greater than 30%, the LED lamp cannot be fully protected from overcurrent.

An LED lamp device according to a sixth aspect of the invention comprises: a power supply unit supplied with an alternating-current or direct-current power supply voltage; and an LED lamp including one or a plurality of serially connected LEDs connected to output terminals of the power supply unit, wherein the power supply unit includes a current detection circuit, an input voltage detecting section, an oscillator circuit, a switching circuit and a switching element, and the switching circuit is supplied with signals from the current detection circuit and the input voltage detecting section to perform ON/OFF control of the switching element.

Preferably, in the LED lamp device according to the sixth aspect of the invention, the power supply unit obtains a rectified wave of the power supply voltage, admits electric power for only part of a time period in which a voltage of the rectified wave corresponding to each half period of a wave of the alternating-current power supply voltage is higher than or equal to a predetermined value, and uses the electric power as power for lighting the LED lamp.

An LED lamp device according to a seventh aspect of the invention comprises: a power supply unit supplied with alternating-current or direct-current power; and an LED lamp including one or a plurality of serially connected LEDs connected to output terminals of the power supply unit, wherein the power supply unit includes an input/output voltage detecting section, an oscillator circuit, a switching control circuit, a switching element and a current detection circuit, and the switching control circuit is supplied with signals from the input/output voltage detecting section and the current detection circuit to perform ON/OFF control of the switching element.

An LED lamp device according to an eighth aspect of the invention comprises: a power supply unit supplied with alternating-current or direct-current power; and an LED lamp including one or a plurality of serially connected LEDs connected to output terminals of the power supply unit, wherein the power supply unit includes a rectifying diode bridge, a current detection circuit, an input voltage detecting section, an oscillator circuit, a switching circuit and a switching element, the switching circuit is supplied with signals from the current detection circuit and the input voltage detecting section to perform ON/OFF control of the switching element, and a capacitor is connected between the switching element and the LED lamp such that the capacitor is charged when the switching element is in an ON state and that electric power is supplied to the LED lamp from the capacitor when the switching element is in an OFF state.

An LED lamp device according to a ninth aspect of the invention comprises: a power supply unit supplied with an alternating-current or direct-current power supply voltage; and an LED lamp including one or a plurality of serially connected LEDs connected to output terminals of the power supply unit, wherein the power supply unit includes a rectifying diode bridge for obtaining a rectified wave of the power supply voltage, an oscillator circuit, a clock signal control circuit and a switched capacitor step-down circuit, the switched capacitor step-down circuit includes a plurality of changeover switches connected in series and capable of being switched between two positions, and a capacitor connected between adjacent ones of the changeover switches, and the changeover switches are switched to either of the two positions by the clock signal control circuit such that the capacitors are charged when the changeover switches are in one of the two positions and that the capacitors are discharged when the changeover switches are in the other of the two positions, thereby lighting the LED lamp.

An LED lamp device according to a tenth aspect of the invention comprises: a power supply unit supplied with alternating-current power; and an LED lamp including one or a plurality of serially connected LEDs connected to output terminals of the power supply unit, wherein the power supply unit includes an oscillator circuit, a clock signal control circuit, a current detection circuit and two switched capacitor step-down circuits, a high voltage-side input terminal of one of the two switched capacitor step-down circuits and a low voltage-side input terminal of the other switched capacitor step-down circuit are connected to one of two input terminals of the power supply unit, and a low voltage-side input terminal of the one switched capacitor step-down circuit and a high voltage-side input terminal of the other switched capacitor step-down circuit are connected to the other of the two input terminals of the power supply unit.

In the aforementioned arrangements according to the invention, the power supply unit is preferably mounted on a flexible printed circuit board, and the flexible printed circuit board is bent into a generally S-shaped form. Preferably, moreover, the power supply unit has terminals attached to opposite sides of the generally S-shaped form of the flexible printed circuit board, and has two AC input terminals attached to opposite surfaces of the flexible printed circuit board. This arrangement makes it possible to save space, to ensure high insulating performance, and also to improve the characteristics and reliability of the device.

Also preferably, the power supply unit generates a pulsed current having a peak current value higher than a set average current value, and the pulsed current has a frequency of not lower than 100 Hz. This arrangement makes it possible to increase the luminance perceivable by human with the use of less electric power.

According to the first to fourth and sixth to tenth aspects of the invention, the power supply unit is constructed such that electric power is admitted for only part of a time period of the power supply voltage cycle and is output as power for driving a load, thus providing a high-efficiency and low-loss power supply unit capable of driving an LED lamp with the use of a desired voltage higher than the power supply voltage, as well as an LED lamp device using such a power supply unit.

According to the fifth aspect of the invention, a high-efficiency and low-loss LED lamp device can be provided wherein dimming can be prevented and also the LED lamp can be protected from overcurrent.

BRIEF DESCRIPTION OF THE DRAWINGS

FIG. 16 is a view showing another exemplary structure of the device according to the present invention;

FIG. 17 shows cross sections of a flexible printed circuit board (Example 1) appearing in FIG. 16, taken along lines shown in the same figure;

FIG. 18 similarly shows cross sections of the flexible printed circuit board (Example 2), taken along the same lines;

FIG. 19 similarly shows cross sections of the flexible printed circuit board (Example 3), taken along the same lines;

BEST MODE OF CARRYING OUT THE INVENTION

Embodiments of the present invention will be hereinafter described with reference to the drawings.

Figure 1:
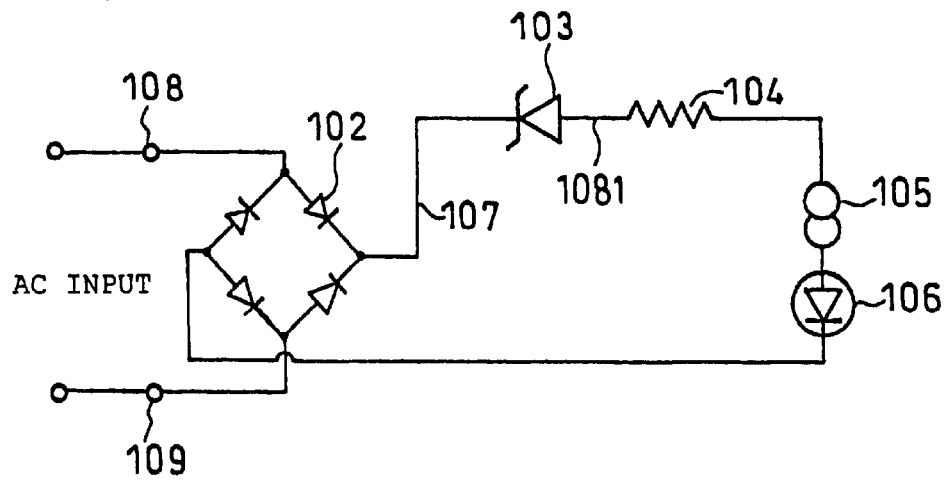
FIG. 1 is a circuit diagram showing a device according to a first embodiment of the present invention.

FIG. 1 is a circuit diagram showing a power supply unit and an LED lamp device according to a first embodiment of the present invention.

In FIG. 1, reference numeral 102 denotes a full-wave rectifying diode bridge (BrD1), 103 denotes a constant-voltage element comprising, in the illustrated example, a Zener diode (Dz1), 104 denotes a series resistor (Rp), 105 denotes a constant-current element (Current Regulated Diode; CRD1), and 106 denotes an LED lamp.

Reference numeral 108 denotes an AC input terminal H (HOT LINE), and 109 denotes another AC input terminal C (COOL LINE). The AC input voltage is a commercial voltage of 100 V.

The LED lamp 106 has an anode thereof connected to a positive output terminal of the full-wave rectifying diode bridge 102 via a series connection of the constant-current element (CRD1) 105, the series resistor 104 and the Zener diode 103 with its polarities connected as illustrated, and has a cathode thereof connected directly to a negative output terminal of the diode bridge 102. The LED lamp 106 comprises one LED or a plurality of serially connected LEDs. The section of the circuit excepting the LED lamp 106 constitutes a power supply unit (This is the case with individual embodiments described later).

Operation of the first embodiment will be now described with reference also to FIG. 2.

Figure 2:
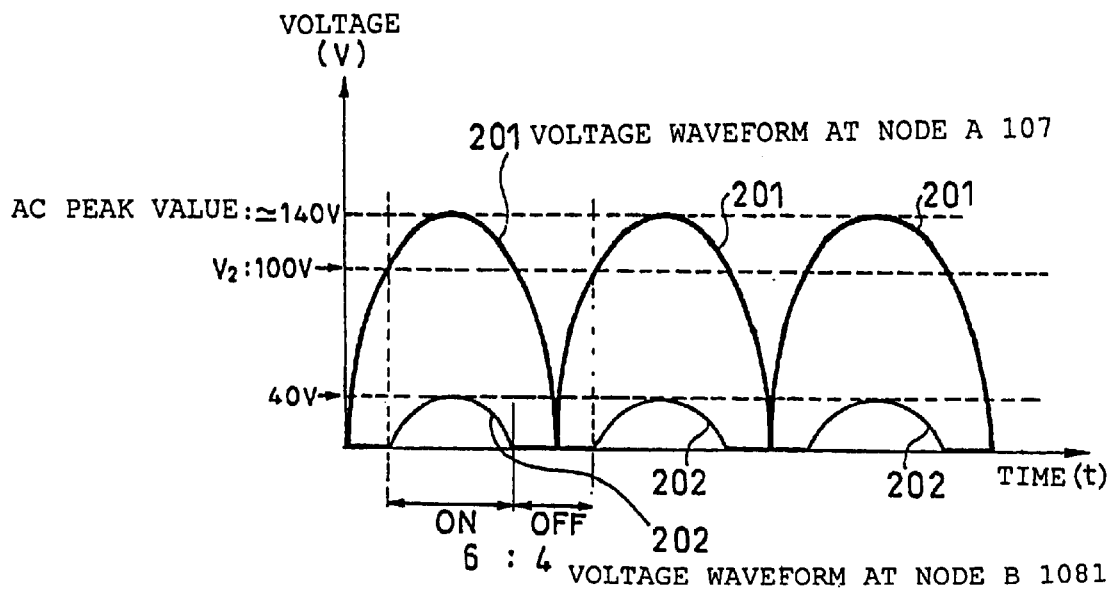
FIG. 2 is a diagram illustrating operation of the first embodiment.

FIG. 2 shows voltage waveforms appearing at nodes A and B indicated, respectively, at 107 and 1081 in FIG. 1. In the chart, the vertical axis indicates voltage (V), the horizontal axis indicates time (t), reference numeral 201 denotes the voltage waveform at the node A 107, and 202 denotes the voltage waveform at the node B 1081.

The peak value of the AC input voltage is approximately 140 V, and the Zener diode 103 has a Zener voltage $V_z$ of 100 V.

As seen from FIG. 2, the AC input voltage of 100 V is subjected to full-wave rectification by the diode bridge 102, and the Zener diode 103 causes the LED lamp 106 to turn on (blink) for a time period in which the voltage of the 100-Hz rectified wave is equal to or higher than 100 V.

In this case, the ratio of blinking intervals, or more specifically, the ON-to-OFF duty ratio of the LED lamp 106, is 6:4 (100 Hz), and thus the electric power efficiency can be increased (loss can be reduced) to an extent such that no flickering of light is perceivable.

The peak value of the voltage applied to the LED lamp 106 corresponds to a value by which the peak voltage applied to the LED lamp 106, the constant-current element 105 and the series resistor 103 exceeds the Zener voltage $V_z$, and therefore, is about 40 V in the illustrated example.

The current passing through the LED lamp 106 is made constant by the constant-current element 105.

Figure 3:
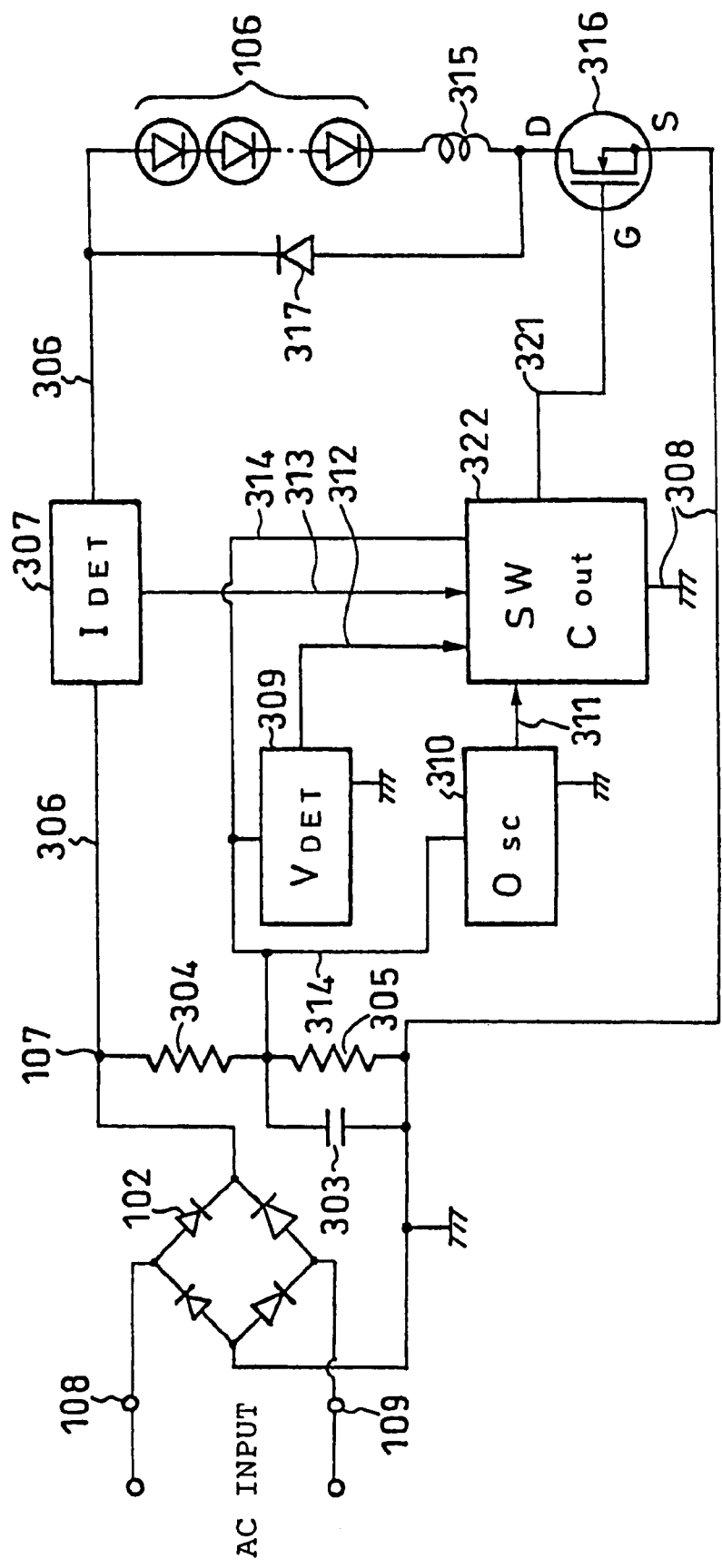
FIG. 3 is a circuit diagram showing a device according to a second embodiment of the present invention.

FIG. 3 is a circuit diagram showing a power supply unit and an LED lamp device according to a second embodiment of the present invention.

In FIG. 3, reference numeral 303 denotes a capacitor ($C_1$), 304 and 305 denote voltage-dividing resistors ($R_1$, $R_2$), 306 denotes a power supply-1 $V_{ddH}$ line, 307 denotes a current detection circuit ($I_{DET}$), 308 denotes a GND (grounding) line, 309 denotes a zero crossing detection-type input voltage detection circuit ($V_{DET}$), 310 denotes an oscillator/frequency divider circuit (Osc/Div), 311 to 313 denote operating lines, 314 denotes a power supply-2 $V_{ddL}$ line, 315 denotes an inductor (coil), 316 denotes a switching element comprising an n-channel MOSFET, 317 denotes a flywheel diode, and 322 denotes a switching control circuit (SWCont). In FIG. 3, identical reference numerals are used to denote elements identical with or equivalent to those appearing in FIG. 1.

The resistors 304 and 305, which are connected in series, divides the output voltage of the full-wave rectifying diode bridge 102, and a voltage division point thereof is connected to an input terminal of the input voltage detection circuit 309, an operating power input terminal of the oscillator/frequency divider circuit 310, and the power supply-2 $V_{ddL}$ line 314. The capacitor 303 is connected between the voltage division point and a ground.

The series connection of the LED lamp 106, the inductor 315 and the switching element 316 is connected between the power supply-1 $V_{ddH}$ line 306 and the GND line 308, and the current detection circuit 307 is inserted in the power supply-1 $V_{ddH}$ line 306. The LED lamp 106 comprises, in this case, two to eight LEDs connected in series.

The flywheel diode 317 is connected in parallel with a series circuit constituted by the LED lamp 106 and the inductor 315.

The switching control circuit 322 is supplied with operating power from the power supply-2 $V_{ddL}$ line 314, as well as with signals from the current detection circuit 307, the input voltage detection circuit 309 and the oscillator/frequency divider circuit 310, and performs ON/OFF control of the switching element 316 (LED lamp 106), as described later.

Figure 4:
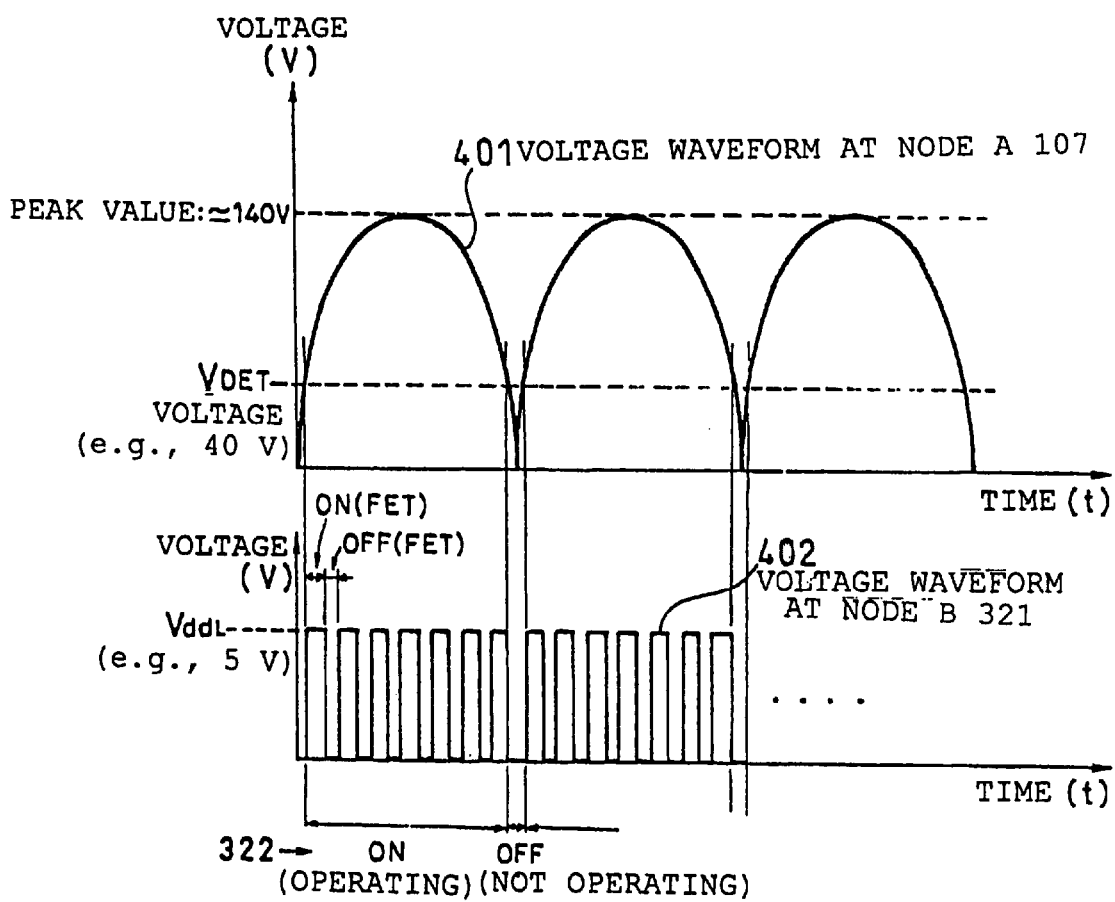
FIG. 4 is a diagram illustrating operation of the second embodiment.

Operation of the second embodiment will be now described also with reference FIG. 4.

FIG. 4 shows voltage waveforms appearing at nodes A and B indicated, respectively, at 107 and 321 in FIG. 3. In the figure, the vertical axis indicates voltage (V), the horizontal axis indicates time (t), reference numeral 401 denotes the voltage waveform at the node A 107, and 402 denotes the voltage waveform at the node B 321.

The peak value of the AC input voltage is about 140 V. The switching control circuit 322 is so set as to start operation when the input voltage (voltage at the node A 107) has risen to 40 V from 0 V, and to stop operation when the input voltage has fallen to 40 V from the peak value. In this example, a voltage at the voltage division point between the resistors 304 and 305 (voltage of the power supply-2 $V_{ddL}$ line 314) is 5 V, and accordingly, the switching control circuit 322 outputs an ON voltage of 5 V when in operation.

As seen from FIG. 4, the AC input voltage of 100 V is subjected to full-wave rectification by the diode bridge 102, and the switching control circuit 322 performs ON/OFF control (PWM control) of the switching element 316 during a time period in which the voltage of the rectified wave is higher than or equal to 40 V, so that the LED lamp 106 turns on and off (blinks).

In the illustrated arrangement, the ON/OFF frequency of the switching element 316, that is, the ON/OFF frequency of the LED lamp 106, is 40 kHz, and thus the electric power efficiency can be increased (loss can be reduced) to an extent such that no flickering of light is perceivable.

The current supplied to the LED lamp 106 is made constant by the switching control circuit 322 so that constant current can be supplied to the LED lamp even if the load (the number of LEDs constituting the LED lamp 106) changes.

The capacitor 303 is applied with the voltage divided by the resistors 304 and 305, in the illustrated example, a low voltage of about 5 V. Accordingly, the capacitor to be used may be low in withstand voltage and also may have a small capacitance since it has only to perform the function of supplying electric power to the input voltage detection circuit 309, the oscillator/frequency divider circuit 310 and the switching control circuit 322.

The "constant current" mentioned above represents a constant current in terms of a mean value. In this embodiment, the switching is performed by the oscillator circuit. Therefore, where the required constant current is 10 mA, for example, the LED lamp is driven with a duty ratio of 30% with the peak current set at 30 mA, thereby obtaining a current of 10 mA on average. The LEDs should desirably be driven by this method to emit light, for the reason explained below.

An LED exhibits superlinear current-luminance characteristics, rather than just linear current-luminance characteristics, when the luminance is perceived by human. For example, where the current is doubled, generally the luminance as perceived is not doubled but is increased by the nth power of "2" (n is a number equal to or greater than "1"). This is because the human eye retains a peak luminance as an afterimage, and provided that an LED is driven by a DC current having a certain mean value and by a duty ratio-controlled (generally, "pulsed" ) current having the same mean value but a higher peak value, the human eye perceives higher brightness when the LED is driven by the pulses than when the LED is driven by the DC current. Thus, by using the pulse driving technique, an identical perceivable luminance can be attained with lower electric power. However, the pulses used should desirably have a frequency of not lower than 100 Hz, because if the frequency is lower than 100 Hz, a disadvantage arises in that flickering is perceived by the human eye. The pulse driving technique is similarly effective in third and fifth embodiments including an oscillator circuit, as described later, and is also effective in fourth and sixth embodiments insofar as LEDs are driven by an AC at 100 Hz or above, though these embodiments include no oscillator circuit.

In the above embodiment, the power supply-2 $V_{dd}$ is simplified in construction through voltage division by means of the resistors, but an active (e.g., switching) power circuit may of course be additionally provided (used) so that the operation can advantageously be stabilized. Also, in the foregoing embodiment, the input voltage $V_{DET}$ for starting the operation is set to 40 V with reference to the input peak voltage of 140 V. Where $V_{DET}$ is thus set to be not lower than several tens of percent of the input, it is unnecessary to set the ON/OFF ratio (duty ratio), which serves as a switching regulator, to an extremely small value (several percent at the minimum), thus making it easy to provide a large margin of circuit design. On the other hand, if $V_{DET}$, apart from the switching frequency, is excessively increased, an AC frequency of, for example, 100 Hz manifests itself as flickering, and where the input AC frequency is 50 Hz or less, for example, the flickering becomes perceivable. In this case, by lowering the input voltage $V_{DET}$ for starting the operation to 3 to 40 V, the LEDs can be operated satisfactorily with an AC frequency of 50 Hz or less, without the possibility of flickering being perceived. However, the duty ratio possibly needs to be extremely small (several percent or less at the minimum, producing nearly spike-shaped pulses). The aforementioned margin of circuit design is in this case relatively narrow, and it is therefore necessary that a high-performance inductor element with excellent characteristics (DC resistance component) and a high-performance switching element with excellent characteristics (switching speed) should be used.

Thus, elements (devices) with relatively high performance may be used from the outset, $V_{DET}$ is set to 3 to 40 V so that the inconvenience associated with the dynamic range of the duty ratio (generation of spike-shaped pulses at the minimum level) or the flickering due to the AC frequency may not occur, and the operation by means of $V_{DET}$ may instead be utilized to stabilize the operations of the oscillator circuit and the switching circuit (to perform control in a manner such that the output is provided after the voltage reaches a level at which the circuits can operate properly), without departing from the spirit of the present invention.

Figure 5:
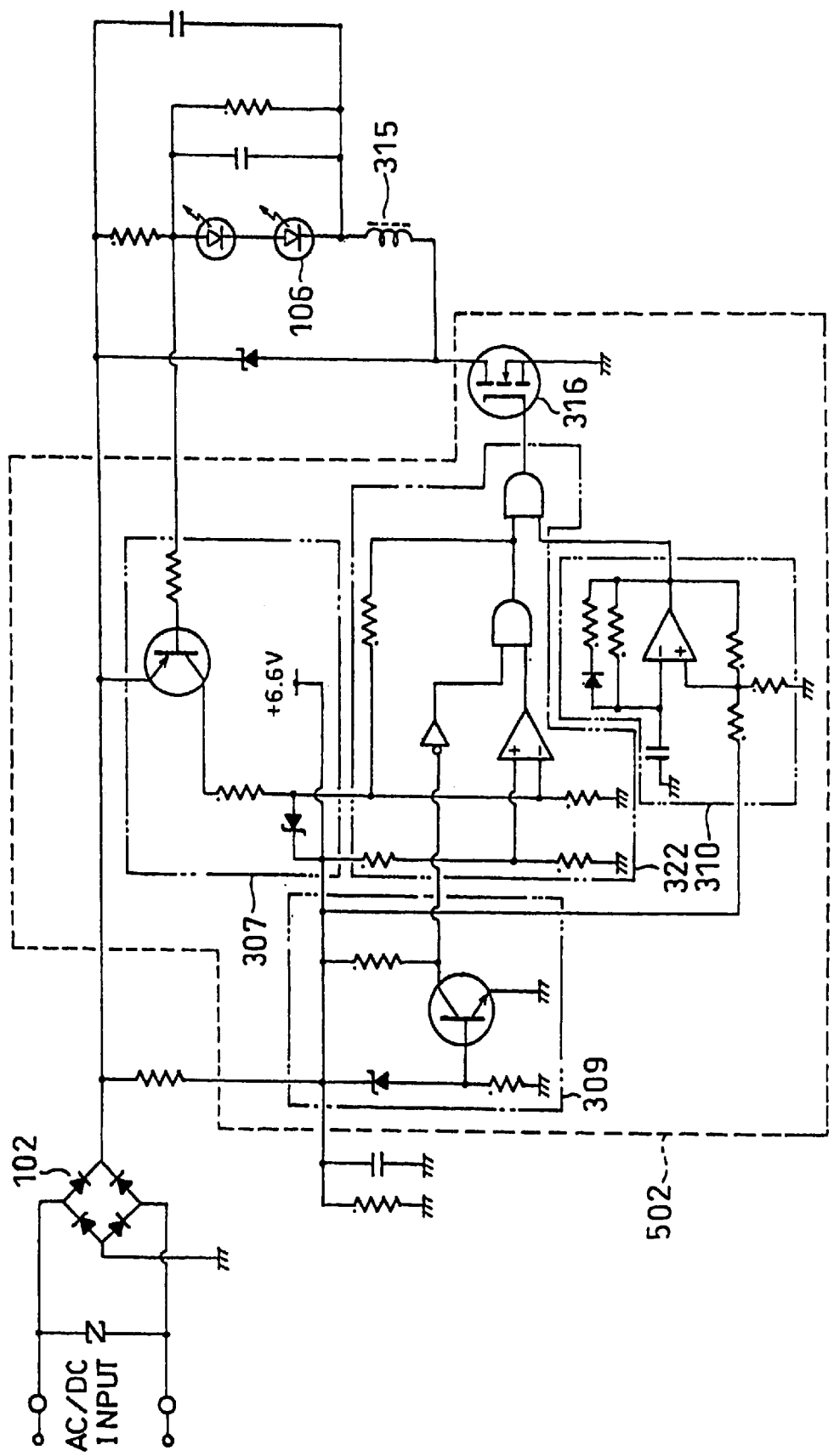
FIG. 5 is a diagram showing in detail an exemplary circuit arrangement of the second embodiment.

FIG. 5 shows in detail an exemplary circuit arrangement of the aforementioned second embodiment. In FIG. 5, reference numeral 502 denotes an integrated circuit which is a one-chip (monolithic) IC. The switching element 316 may alternatively be arranged outside the integrated circuit 502. Also, in FIG. 5, identical reference numerals are used to denote elements corresponding to those appearing in FIG. 3.

Figure 6:
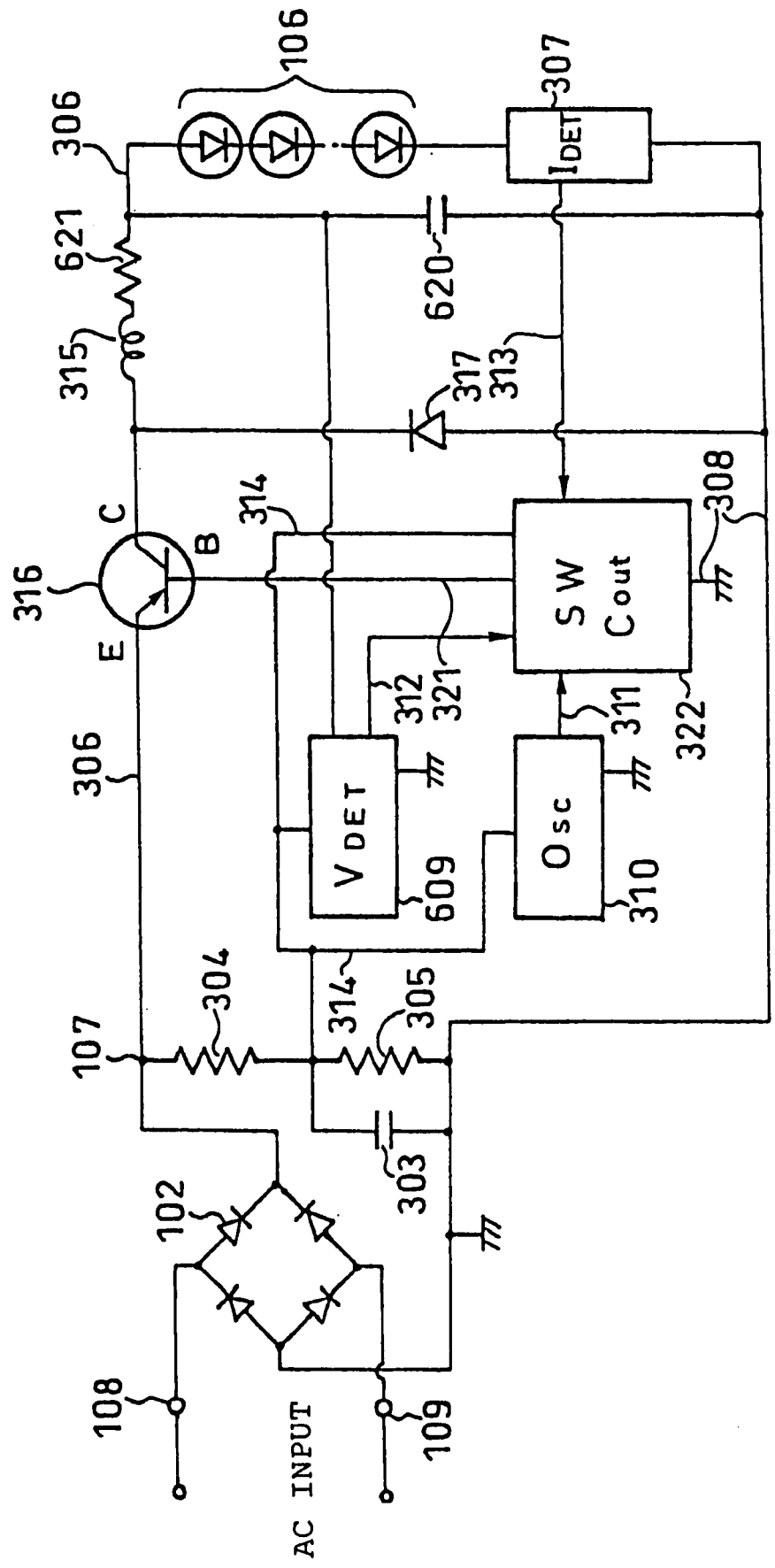
FIG. 6 is a circuit diagram showing a device according to a third embodiment of the present invention.

FIG. 6 is a circuit diagram showing a power supply unit and an LED lamp device according to a third embodiment of the present invention. In FIG. 6, reference numeral 609 denotes an input/output voltage detection circuit, 620 denotes a capacitor ($C_2$), and 621 denotes a series resistor (Rs). In FIG. 6, identical reference numerals are used to denote elements identical with or equivalent to those appearing in FIG. 3. In this embodiment, however, the switching element 316 comprises a pnp transistor connected in a manner such that the emitter-collector thereof is directed forward to the positive output terminal of the full-wave rectifying diode bridge 102, with respect to the LED lamp 106. Also, the current detection circuit 307 is connected to the negative output terminal of the diode bridge 102.

The inductor 315 is connected between the switching element 316 constituted by the transistor and the LED lamp 106, and the series resistor 621 is connected between the inductor 315 and the LED lamp 106.

The input/output voltage detection circuit 609 detects the output voltage, and a detected value of the output voltage is applied to the switching control circuit 322, like the detected value of the input voltage. Specifically, the input/output voltage detection circuit 609 functions as a limiter through detection of the output voltage, and controls the switching control circuit 322 such that the power supply section (circuit section excluding the LED lamp 106) usually acts as a voltage feedback switching power supply but acts as a current feedback switching power supply when the LED lamp 106 is connected.

Namely, the input/output voltage detection circuit 609 serves as an output voltage regulator for keeping the output voltage for the LED lamp at a fixed level. If, in the circuit shown in FIG. 6, the output voltage is 16 V and the LED lamp is driven at 2 V, for example, the output voltage is set to 2 V when the load exceeds 10 mA. In other words, the operation at a constant current of 10 mA is maintained while the output voltage is within a range of 2 V to 16 V.

In the third embodiment, the switching element 316 may be constituted by an n-channel MOSFET, instead of a pnp transistor.

Figure 7:
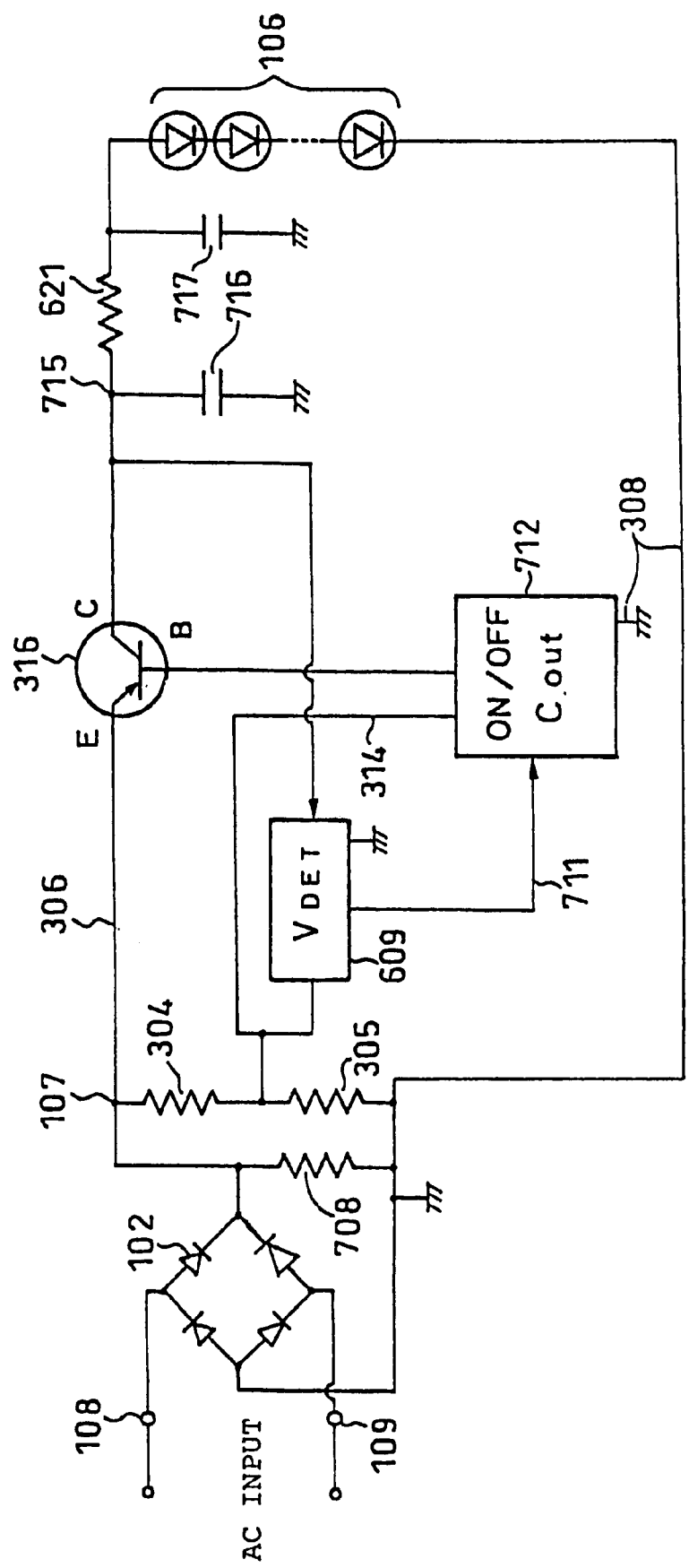
FIG. 7 is a circuit diagram showing a device according to a fourth embodiment of the present invention.

FIG. 7 is a circuit diagram showing a power supply unit and an LED lamp device according to a fourth embodiment of the present invention.

In FIG. 7, reference numeral 708 denotes a resistor ($R_3$) for zero crossing detection, 711 denotes an operating line, 712 denotes an ON/OFF control circuit (ON/OFF Cont), and 716 and 717 denote capacitors ($C_3$, $C_4$). Also in FIG. 7, identical reference numerals are used to denote elements identical with or equivalent to those appearing in FIG. 6. The capacitor 716 has the function of smoothing the output voltage of the switching element 316 (voltage at a node B 715), while the capacitor 717 constitutes a discharging/charging circuit in cooperation with the series resistor 621. In this embodiment, the LED lamp 106 comprises two to several hundreds of serially connected LEDs.

Further, the fourth embodiment does not include the current detection circuit 307, the oscillator/frequency divider circuit 310, the flywheel diode 317, etc. of the third embodiment shown in FIG. 6, and includes, instead of the switching control circuit 322, the ON/OFF control circuit 712. The ON/OFF control circuit 712 is supplied with a signal from the input/output voltage detection circuit 609 and performs ON/OFF control of the switching element 316, as described below.

Specifically, in the fourth embodiment, the OFF period of the switching element 316 is prolonged to further cut down the consumption of current (electric powder), and during the OFF period, the LED lamp 106 is supplied with electric power from the capacitors 716 and 717 to be turned on.

Also, in the fourth embodiment, the voltages for turning ON and OFF the switching element 316 can be set by the ON/OFF control circuit 712; for example, the ON and OFF voltages may be set to 30 V and 16 V, respectively. Accordingly, a transistor having a low withstand voltage can be used as the switching element 316.

Operation of the fourth embodiment will be now described with reference also to FIG. 8.

Figure 8:
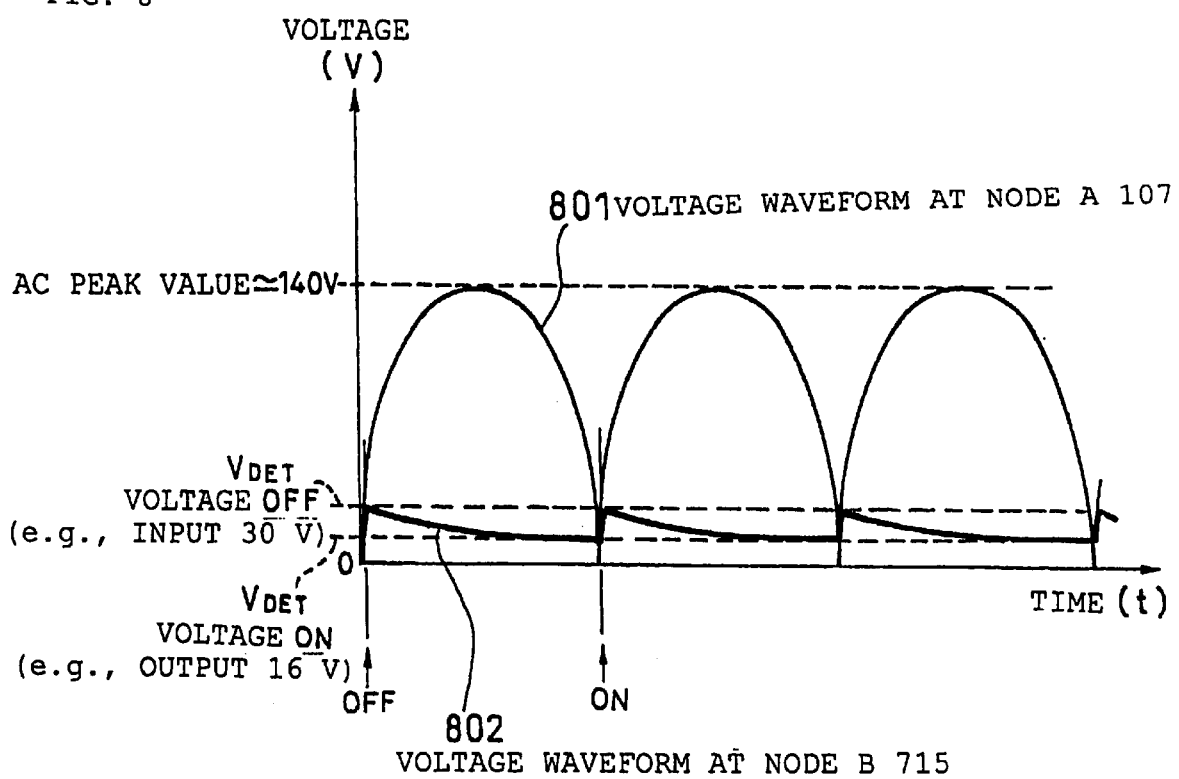
FIG. 8 is a diagram illustrating operation of the fourth embodiment.

FIG. 8 shows voltage waveforms appearing at nodes A and B indicated, respectively, at 107 and 715 in FIG. 7, wherein the vertical axis indicates voltage (V), the horizontal axis indicates time (t), reference numeral 801 denotes the voltage waveform at the node A 107, and 802 denotes the voltage waveform at the node B 715.

The ON/OFF control circuit 712 is applied with the AC input voltage having a peak value of approximately 140 V, and operates so as to turn ON the switching element when the input voltage (voltage at the node A 107) rises to 30 V from 0 V, and to turn OFF the switching element while 30 V is exceeded. The voltage at the node B decreases thereafter, and the switching element remains in the OFF state while the voltage at the node B decreases from the specified value (about 30 V as stated above) down to 16 V. When the voltage decreases below 16 V, the switching element is again turned ON. The ON/OFF control circuit 712 repeats this operation.

Thus, in the fourth embodiment, the AC input voltage of 100 V is subjected to full-wave rectification by the diode bridge 102, and the ON/OFF control circuit 712 causes the switching element 316 to turn ON during a time period in which the voltage of the rectified wave is equal to or lower than 30 V and also the output voltage (voltage at the node B 715) is below 16 V. The LED lamp 106 is thereafter supplied with electric power from the capacitors 716 and 717 until the voltage of the rectified wave reaches 30 V, whereby the LED lamp can be continuously lit with low electric power. With this arrangement, the electric power efficiency can be increased (loss can be reduced), without entailing flickering of light.

Also, the operation starting and stopping voltages of the ON/OFF control circuit 712 can be set as desired to minimum voltages that are required to turn on and off the LED lamp 106 constituted by a desired number of serially connected LEDs. Further, the current supplied to the LED lamp 106 can be set as desired by suitably selecting the series resistor 621 and the capacitors 716 and 717. Since the lamp can be driven by a large current, the number of serially connected LEDs constituting the LED lamp 106 can be increased up to several hundreds.

The fourth embodiment has been described on the assumption that the input used is AC input, for ease of understanding. Needless to say, this embodiment can perform desired operation even if the input used is DC input.

Figure 9:
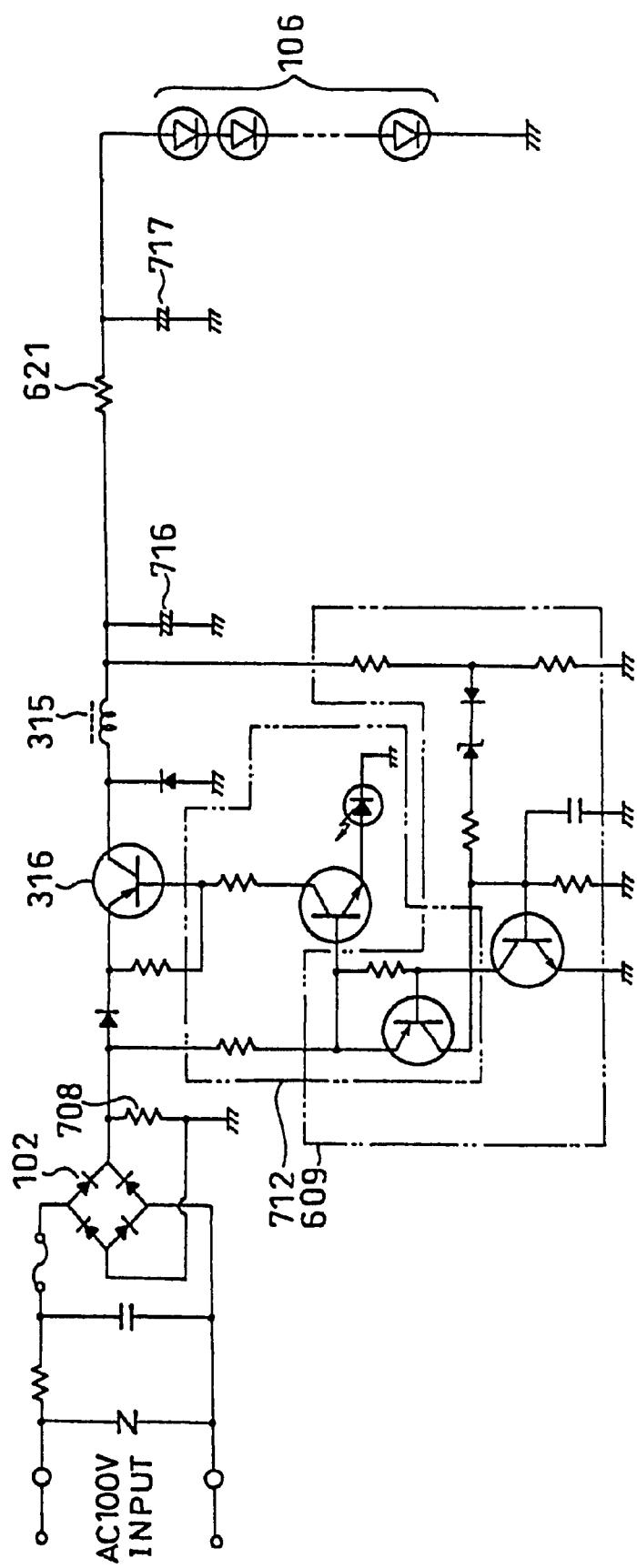
FIG. 9 is a diagram showing in detail an exemplary circuit arrangement of the fourth embodiment.

FIG. 9 shows in detail an exemplary circuit arrangement of the fourth embodiment. In FIG. 9, identical reference numerals denote elements identical with those appearing in FIG. 7.

Figure 10:
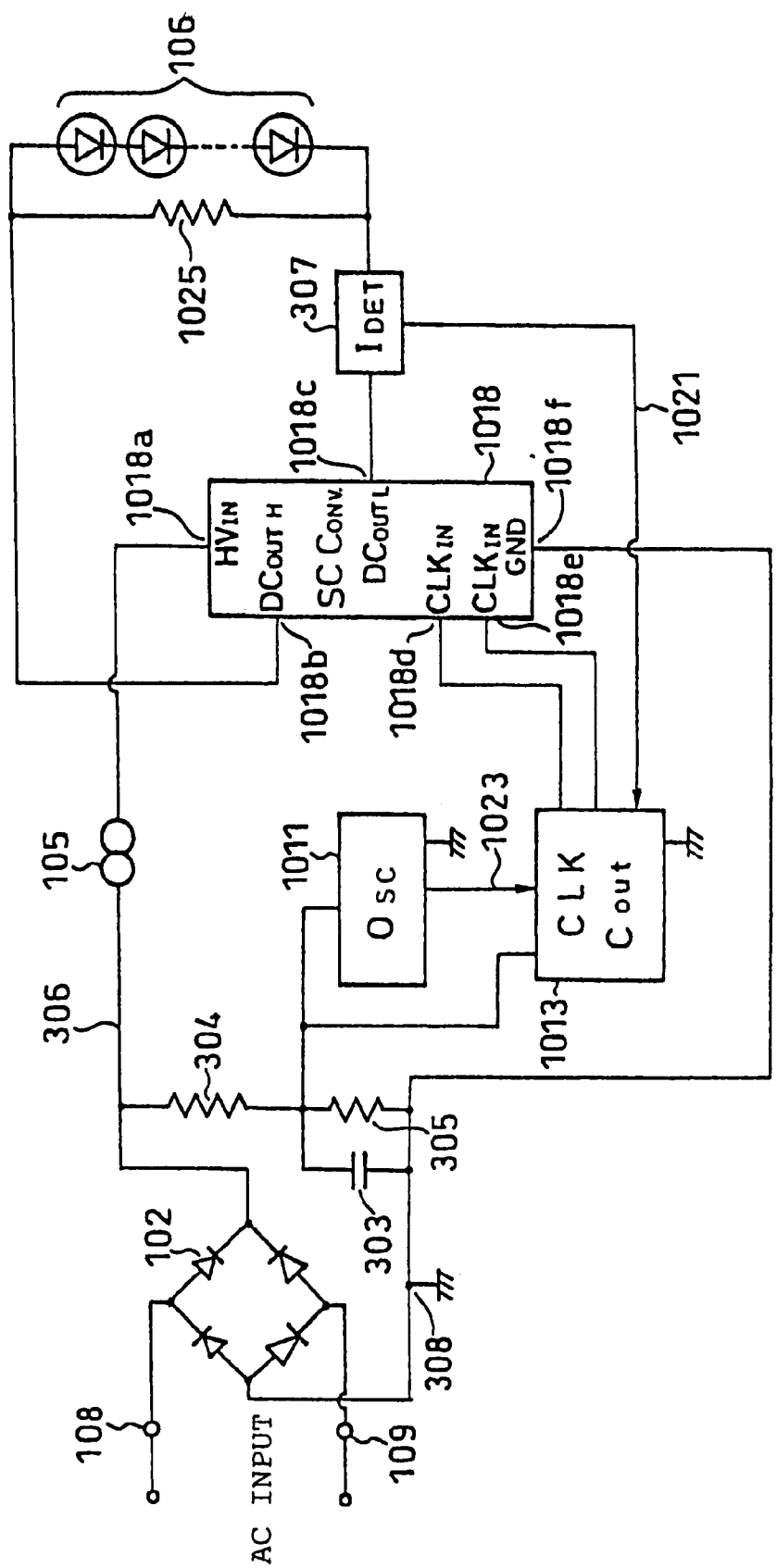
FIG. 10 is a circuit diagram showing a device according to a fifth embodiment of the present invention.

FIG. 10 is a circuit diagram showing a power supply unit and an LED lamp device according to a fifth embodiment of the present invention.

In FIG. 10, reference numeral 1011 denotes an oscillator circuit (Osc), 1013 denotes a clock signal control circuit (CLKCont), 1018 denotes a switched capacitor step-down circuit (SCConv), 1021 and 1023 denote operating lines, and 1025 denotes a bleeder resistor ($R_B$). Also, in FIG. 10, identical reference numerals are used to denote elements identical with or equivalent to those appearing in FIGS. 1 and 6. In this embodiment, the switched capacitor step-down circuit 1018 performs the ON/OFF control of the power supply to the LED lamp 106, as well as a voltage step-down function and constant-current control.

The switched capacitor step-down circuit 1018, which is supplied with signals from the clock signal control circuit 1013 and the current detection circuit 307, controls a positive output (HV) of the full-wave rectifying diode bridge 102, applied thereto through the constant-current element 105, and also provides a direct-current output $DC_{OUT}$ to the LED lamp 106 to turn on the same.

Thus, the switched capacitor step-down circuit 1018 has an HV input terminal 1018a, an HV output terminal 1018b, an LV output terminal 1018c, a clock input terminal 1018d, an inverted clock input terminal 1018e, and a grounding terminal 1018f.

The HV input terminal 1018a is connected to the positive output terminal through the constant-current element 105, the HV output terminal 1018b is connected to the anode side of the LED lamp 106, and the LV output terminal 1018c is connected to the cathode side of the LED lamp 106 through the current detection circuit 307. The clock input terminal 1018d and the inverted clock input terminal 1018e are connected to a clock output terminal and an inverted clock output terminal, respectively, of the clock signal control circuit 1013, and the grounding terminal 1018f is connected to the GND line 308 (grounded).

The oscillator circuit 1011 is supplied with a voltage divided by the resistors 304 and 305, and outputs a predetermined oscillating signal to the operating line 1023. The clock signal control circuit 1013 is supplied with a current detection signal and the oscillating signal via the operating lines 1021 and 1023, respectively, and provides a clock signal, of which the duty ratio has been controlled in accordance with the value of the current detection signal, to the switched capacitor step-down circuit 1018. The bleeder resistor 1025 is connected in parallel with the LED lamp 106. The LED lamp 106 comprises two to eight LEDs connected in series.

The switched capacitor step-down circuit 1018 will be now described in more detail.

Figure 11:
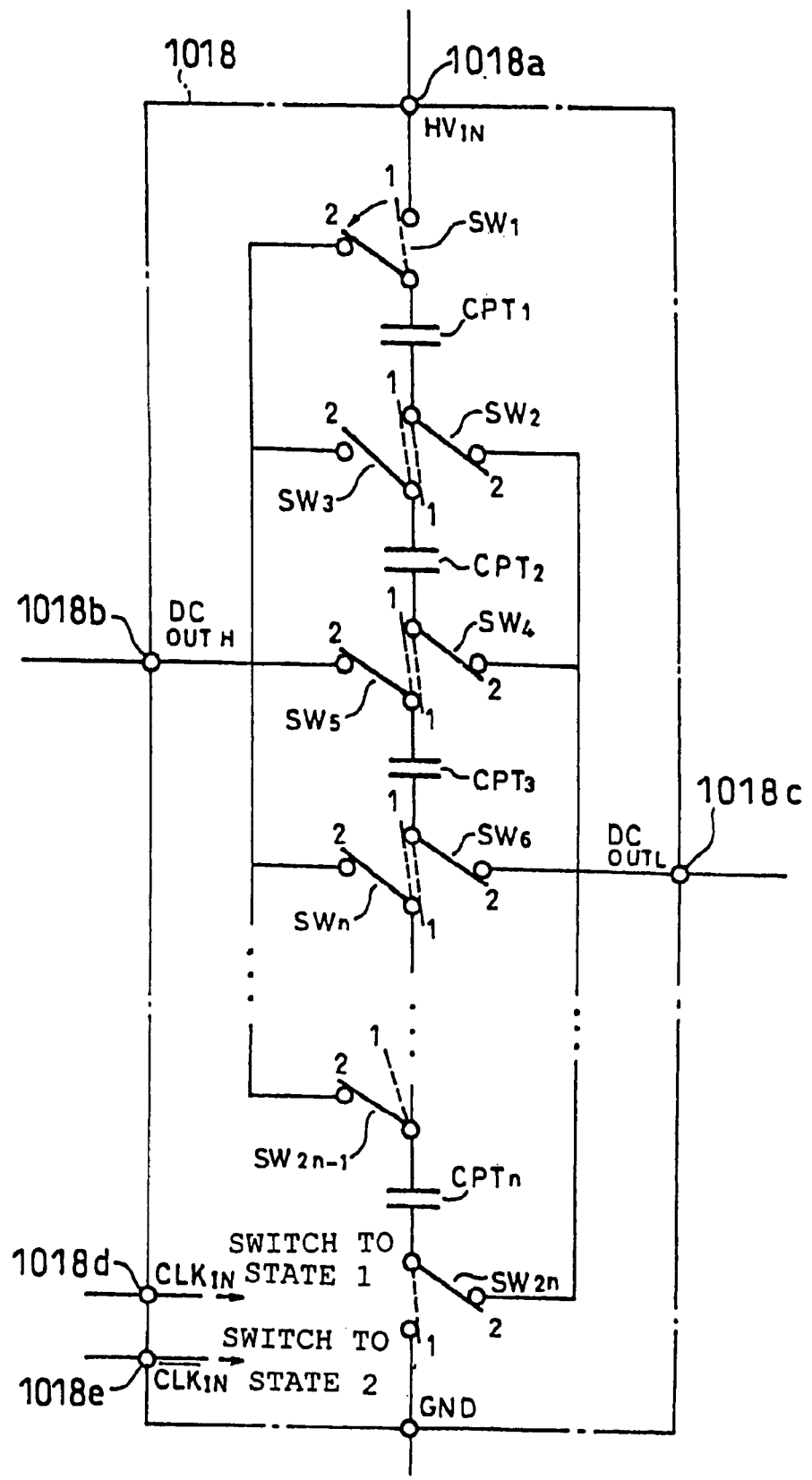
FIG. 11 is a diagram illustrating the principle of operation of a switched capacitor step-down circuit appearing in FIG. 10.

FIG. 11 illustrates the principle of operation of the switched capacitor step-down circuit 1018, wherein $SW_1$ through $SW_{2n}$ represent switches, and $CPT_1$ to $CPT_n$ represent capacitors. In FIG. 11, reference numerals 1018a to 1018f denote the same terminals as those shown in FIG. 10.

The clock input terminal 1018d is supplied with a clock signal for shifting the switches $SW_1$–$SW_{2n}$ individually to "1" side (state 1), while the inverted clock input terminal 1018e is supplied with an inverted clock signal for shifting the switches $SW_1$–$SW_{2n}$ individually to "2" side (state 2).

The capacitors $CPT_1$ to $CPT_n$ are connected to the switches $SW_1$ to $SW_{2n}$ in a manner such that in the state 1, the capacitors are connected in series between the HV input terminal 1018a and the grounding terminal 1018f, and that in the state 2, the capacitors are connected in parallel between the HV output terminal 1018b and the LV output terminal 1018c. The switches $SW_1$ to $SW_{2n}$ are connected to the respective terminals 1018a to 1018c and 1018f such that the capacitors $CPT_1$ to $CPT_n$ can be connected in the above manner in the respective states.

Referring also to FIG. 10, operation of the switched capacitor step-down circuit 1018 will be described. In the state 1, the serially connected capacitors $CPT_1$ to $CPT_n$ are connected to the power supply-1 $V_{ddH}$ line 306 through the HV input terminal 1018a, so that current flows through the capacitors toward the grounding terminal 1018f, charging the individual capacitors.

In the state 2, the parallel connected capacitors $CPT_1$ to $CPT_n$ are connected to the anode side of the LED lamp 106 through the HV output terminal 1018b and discharge current flows toward the LV output terminal 1018c, so that the LED lamp 106 is turned on.

The states 1 and 2 alternately take place at a predetermined frequency (period) by the action of the switches $SW_1$ to $SW_{2n}$, the changeover of which is controlled by the clock signal and the inverted clock signal input to the clock input terminal 1018d and the inverted clock input terminal 1018e, respectively. Consequently, the aforementioned charging and discharging of the capacitors $CPT_1$ to $CPT_n$ are repeated at the predetermined frequency to turn on (blink) the LED lamp 106.

The ON/OFF (blinking) frequency of the LED lamp 106 is set to 40 kHz, for example, by the clock signal control circuit 1013, whereby the electric power efficiency can be increased (loss can be reduced) to an extent such that no flickering of light can be perceived.

The clock signal control circuit 1013 sets an appropriate frequency for the clock signal and the inverted clock signal in accordance with the signal supplied thereto from the current detection circuit 307. Also, the output voltage of the switched capacitor step-down circuit 1018 (HV output terminal 1018b) is set to a suitable value by selecting the capacitance of the capacitors $CPT_1$ to $CPT_n$, etc.

Thus, with the aforementioned arrangement using the switched capacitor step-down circuit 1018, commercial power supply voltage can be decreased to a low voltage suited for the LED lamp 106 and be applied to the LED lamp 106, without the need to use a transformer, the inductor 315 or a switching element having high withstand voltage. The constant-current element 105 may be omitted or replaced by a resistor.

Specifically, a voltage regulator may be constituted so as to perform voltage feedback control (to output a constant voltage through alteration of the clock frequency), instead of current feedback control. Thus, this embodiment makes it possible to reduce the size and cost of a power supply for AC adaptors and also is unique and novel because an isolated power supply can be constituted without using a transformer.

Figure 12:
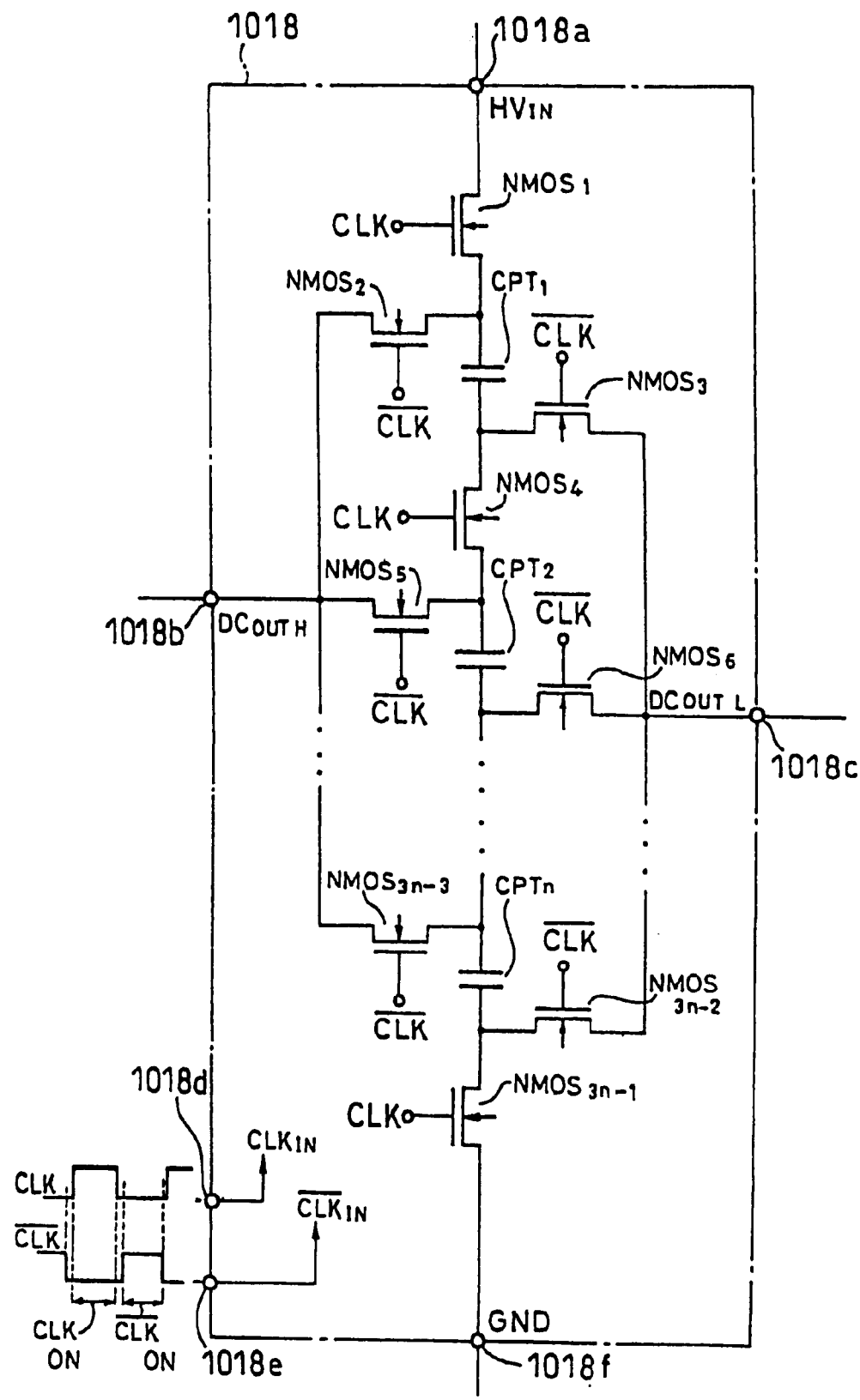
FIG. 12 is a diagram showing in detail an exemplary circuit arrangement of the switched capacitor step-down circuit.

FIG. 12 shows in detail an exemplary circuit arrangement of the switched capacitor step-down circuit 1018 explained above with reference to FIG. 11. In FIG. 12, $NMOS_1$ to $NMOS_{3n-1}$ each represent an n-channel MOSFET. Also, in FIG. 12, identical reference numerals denote elements identical with those appearing in FIG. 11.

The switched capacitor step-down circuit described above is fit to be implemented by a monolithic semiconductor integrated circuit. Specifically, by increasing the number of the serially connected capacitors, it is possible to lower the withstand voltage that each capacitor should have, and such reduction of the withstand voltage permits reduction of the thickness of the dielectric film (insulating film), that is, reduction of the area occupied by one capacitor.

Figure 13:
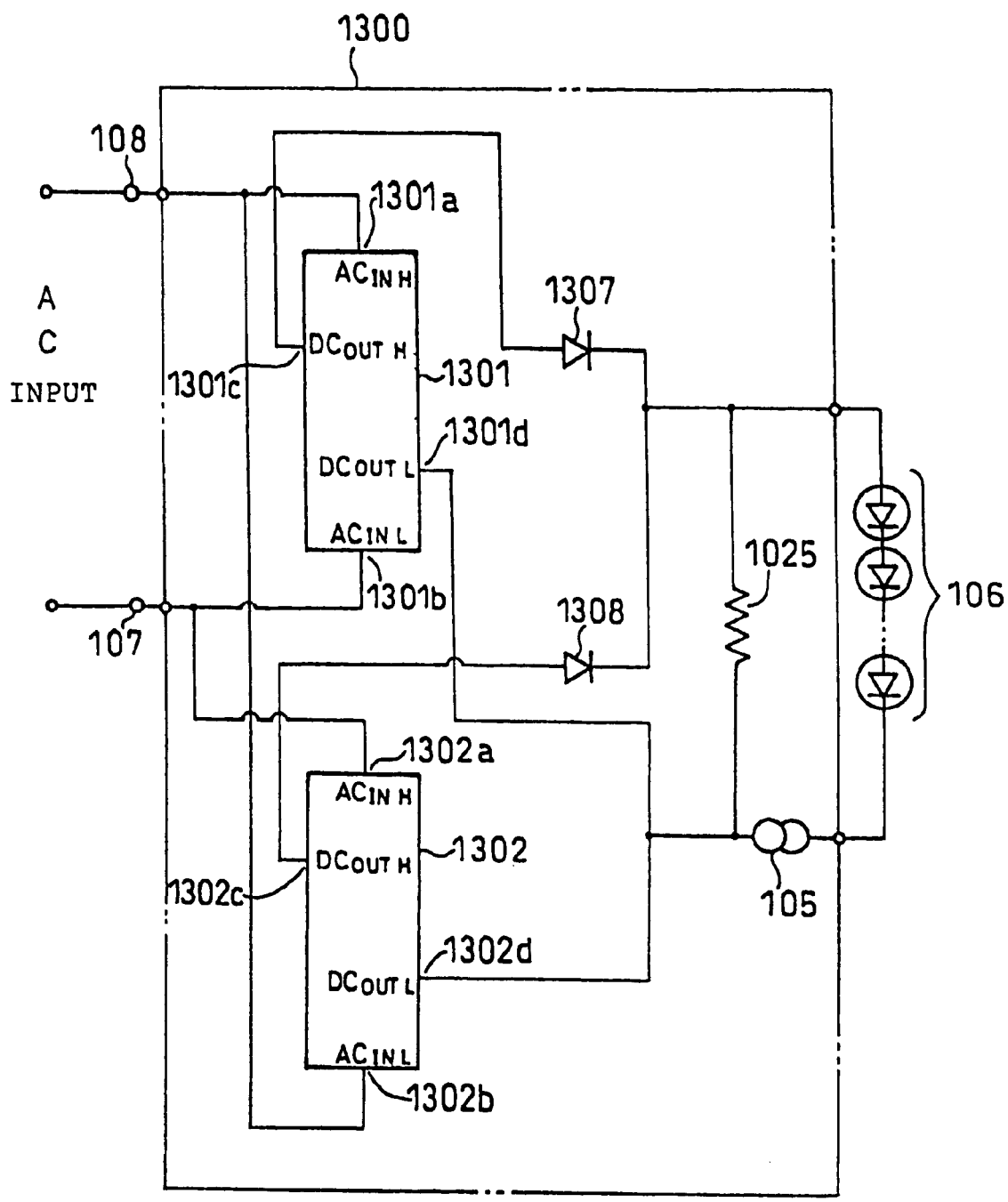
FIG. 13 is a circuit diagram showing a device according to a sixth embodiment of the present invention.

FIG. 13 is a circuit diagram showing a power supply unit and an LED lamp device according to a sixth embodiment of the present invention.

In FIG. 13, reference numeral 105 denotes a constant-current element, 106 denotes an LED lamp constituted by two to eight serially connected LEDs, 108 denotes an AC input terminal H, 107 denotes another AC input terminal C, and 1025 denotes a bleeder resistor. Also, reference numeral 1300 denotes an integrated circuit which is a one-chip (monolithic) IC, 1301 and 1302 denote switched capacitor step-down circuits (SCConv), and 1307 and 1308 denote reverse-current blocking diodes ($Di_1$, $Di_2$). The AC input voltage is a commercial power supply voltage of 100 V.

The switched capacitor step-down circuits 1301 and 1302 are supplied with the AC input from the AC input terminals H 108 and C 107, and provide direct-current outputs $DC_{OUT}$ to the LED lamp 106 to turn on the same.

Each switched capacitor step-down circuit 1301, 1302 has an $AC_H$ input terminal 1301a, 1302a, an $AC_L$ input terminal 1301b, 1302b, an HV output terminal 1301c, 1302c, and an LV output terminal 1301d, 1302d.

The $AC_H$ and $AC_L$ input terminals 1301a, 1302a; 1301b, 1302b of the switched capacitor step-down circuits 1301 and 1302 are connected to the AC input terminals in a crosswise fashion. Specifically, the $AC_H$ input terminal 1301a of the switched capacitor step-down circuit 1301 and the $AC_L$ input terminal 1302b of the switched capacitor step-down circuit 1302 are connected to the AC input terminal H 108, while the $AC_L$ input terminal 1301b of the circuit 1301 and the $AC_H$ input terminal 1302a of the circuit 1302 are connected to the AC input terminal C.

The HV output terminal 1301c of the switched capacitor step-down circuit 1301 is connected to the anode side of the LED lamp 106 through the reverse-current blocking diode 1307. Similarly, the HV output terminal 1302c of the switched capacitor step-down circuit 1302 is connected to the anode side of the LED lamp through the reverse-current blocking diode 1308.

The LV output terminals 1301d and 1302d of the switched capacitor step-down circuits 1301 and 1302 are joined together and connected to the cathode side of the LED lamp 106 through the constant-current element.

The bleeder resistor 1025 is connected in parallel with the LED lamp 106, with the constant-current element connected to one end thereof. The LED lamp 106 comprises two to eight serially connected LEDs.

The switched capacitor step-down circuits 1301 and 1302 will be now described in more detail.

Figure 14:
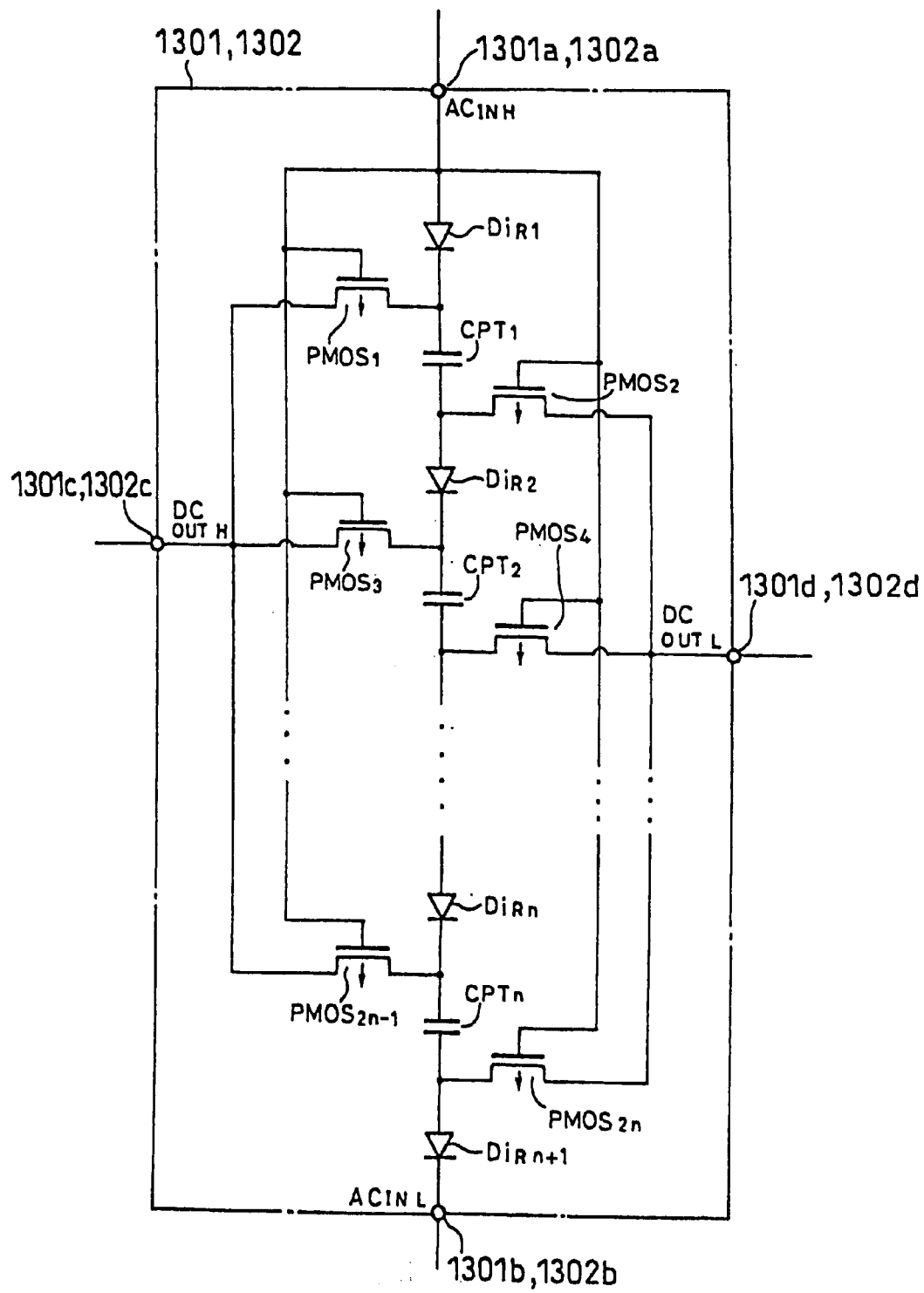
FIG. 14 is a diagram showing in detail an exemplary circuit arrangement of a switched capacitor step-down circuit appearing in FIG. 13.
Figure 15A:
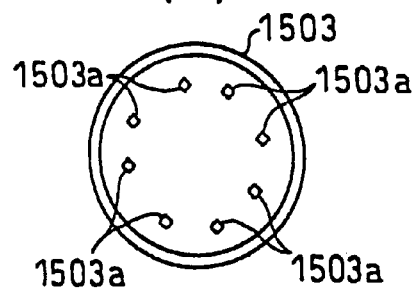
FIGS. 15(a)–15(d) show an exemplary structure of a device according to the present invention.
Figure 15B:
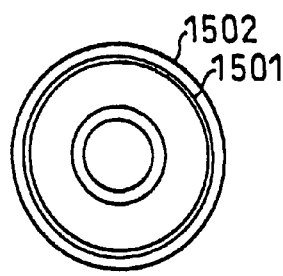
Figure 15C:
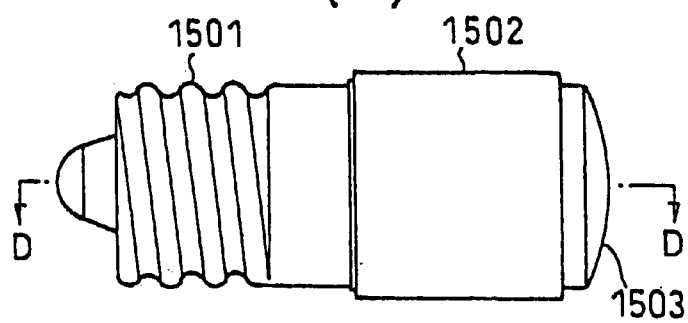
Figure 15D:
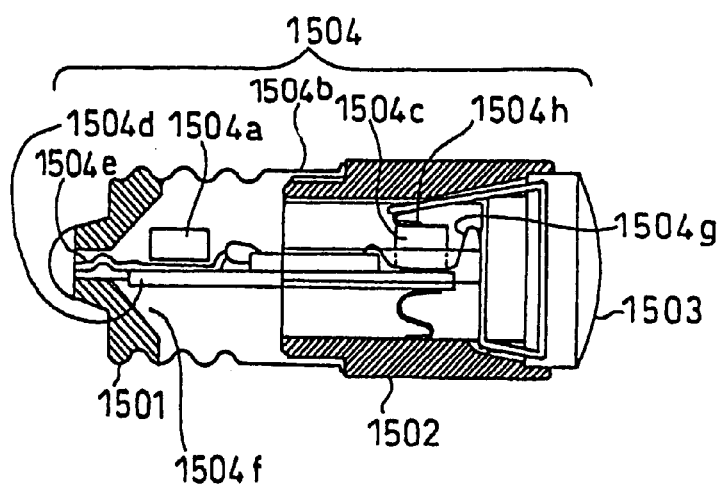

FIG. 14 shows in detail an exemplary circuit arrangement of the switched capacitor step-down circuit 1301, 1302. In FIG. 14, $PMOS_1$ through $PMOS_{2n}$ represent p-channel MOSFETs, $CPT_1$ through $CPT_n$ represent capacitors, and $Di_{R1}$ through $Di_{Rn+1}$ represent rectifying diodes. Also, in FIG. 14, reference numerals 1301, 1302, 1301a to 1301d and 1302a to 1302d represent the corresponding elements shown in FIG. 13.

Each of the p-channel MOSFETs $PMOS_1$ to $PMOS_{2n}$ is switched OFF when positive voltage is applied to the gate thereof, and is switched ON when negative voltage is applied to the gate. The capacitors $CPT_1$ to $CPT_n$ are connected to the p-channel MOSFETs $PMOS_1$ to $PMOS_{2n}$ in a manner such that on the positive side of the AC input, the capacitors are connected in series between the $AC_H$ input terminal 1301a, 1302a and the $AC_L$ input terminal 1301b, 1302b, and that on the negative side of the AC input, the capacitors are connected in parallel between the HV output terminal 1301c, 1302c and the LV output terminal 1301d, 1302d. The p-channel MOSFETs $PMOS_1$ to $PMOS_{2n}$ are connected to the individual terminals 1301a to 1301d, 1302a to 1302d so that the capacitors $CPT_1$ to $CPT_n$ can be connected in the aforementioned manner.

Operation of the switched capacitor step-down circuit 1301, 1302 will be now described with reference also to FIG. 13. In the case of the switched capacitor step-down circuit 1301, during the positive interval of the AC input, the serially connected capacitors $CPT_1$ to $CPT_n$ are connected to the AC input terminal H 108 through the $AC_H$ input terminal 1301a, so that current flows through the capacitors toward the $AC_L$ input terminal 1301b, thus charging the capacitors.

During the negative interval of the AC input, the parallel connected capacitors $CPT_1$ to $CPT_n$ are connected to the anode side of the LED lamp 106 through the HV output terminal 1301c and the reverse-current blocking diode 1307, and discharge current flows toward the LV output terminal 1301d, so that the LED lamp 106 is turned on (blinked) at 50 Hz (in the case where the commercial alternating-current power has a frequency of 50 Hz).

The operation of the switched capacitor step-down circuit 1302 is the same as that of the above switched capacitor step-down circuit 1301 but is reverse thereto with respect to the positive and negative intervals of the AC input, whereby the LED lamp 106 is turned on (blinked) at 50 Hz (in the case where the commercial alternating-current power has a frequency of 50 Hz) with a phase difference of 90° from the switching operation by the circuit 1301.

Consequently, the LED lamp 106 is turned on (blinked) at 100 Hz, thus increasing the electric power efficiency (reducing the loss) to an extent such that no flickering of light can be perceived.

In these switched capacitor step-down circuits 1301 and 1302, the p-channel MOSFETs $PMOS_1$ to $PMOS_{2n}$ per se are switched on and off (i.e., switched OFF when positive voltage is applied to the gate and switched ON when negative voltage is applied to the gate), and it is therefore unnecessary to use control pulses (clock etc.). The output voltage of each switched capacitor step-down circuit 1301, 1302 (HV output terminal 1301*c*, 1302*c*) is set to a suitable value by selecting the capacitance of the capacitors $CPT_1$ to $CPT_n$, etc.

With the aforementioned arrangement using the switched capacitor step-down circuits 1301 and 1302, the commercial power supply voltage can be lowered to a voltage suited for the LED lamp 106 and be applied to the lamp, without the need to use a transformer, the inductor 315 or a switching element with high withstand voltage. Also, this embodiment makes it unnecessary to use the full-wave rectifying diode bridge.

Namely, a voltage regulator is constituted so as to perform voltage feedback control (to output a constant voltage), instead of current feedback control. Thus, like the fifth embodiment, this embodiment makes it possible to reduce the size and cost of a power supply for AC adaptors and also is unique and novel because an isolated power supply can be constituted without using a transformer.

In the sixth embodiment (FIG. 13), the constant-current element 105 may alternatively be connected to the anode side of the LED lamp 106, and the reverse-current blocking diodes 1307 and 1308 may be omitted. Further, the bleeder resistor 1025 and the constant-current element 105 may be provided outside the integrated circuit 1300 (as external elements).

FIGS. 15(*a*)–15(*d*) show an exemplary structure of an LED lamp device according to the present invention, wherein FIG. 15(*a*) is a front view, FIG. 15(*b*) is a rear view, FIG. 15(*c*) is a right side view, and FIG. 15(*d*) is a sectional view taken along line D—D in FIG. 15(*c*). It is to be noted that the figures illustrate a minimum-structure.

In the figures, reference numeral 1501 denotes an E-10 type base, 1502 denotes a cylindrical case of synthetic resin or glass coupled to the base 1501, and 1503 denotes an LED lamp module so attached as to close a distal end of the case 1502. The lamp device is formed so that its external shape as a whole may resemble that of a glow starter for fluorescent lamps having an E-10 type base.

The LED lamp module 1503 has eight LED chips 1503*a* arranged in a manner such that, as shown in the front view, the LED chips are situated on an identical concentric circle with an appropriate radius from the center of the module 1503 at nearly equal intervals in the circumferential direction. The LED chips 1503*a*, which are connected in series, are connected to the output terminal of a power supply unit 1504 (the circuit section excluding the LED lamp 106 in the aforementioned individual embodiments).

The power supply unit 1504 includes a full-wave rectifying diode bridge 1504*a*, an IC chip 1504*b*, an inductor 1504*c*, and a circuit board 1504*d* on which these elements 1504*a* to 1504*c* are mounted (in the case of the second to fourth embodiments). In the case of the first, fifth and sixth embodiments, the inductor 1504*c* is omitted.

Reference numerals 1504*e* and 1504*f* denote AC input lead wires, and 1504*g* and 1504*h* denote power supply lead wires for the LED lamp module.

With the device of the present invention constructed as described above, the base 1501 is screwed into a commercial alternating-current power input socket (not shown), whereupon the commercial alternating-current power is supplied to the power supply unit 1504 through the AC input lead wires 1504*e* and 1504*f* and the eight LED chips 1503*a* in the LED lamp module 1503 are turned on simultaneously for the purpose of indication or illumination.

FIG. 16 is a sectional view showing another exemplary structure of the LED lamp device according to the present invention, wherein the power supply unit 1504 of the aforementioned individual embodiments, excepting the LED lamp 106, is mounted on a flexible printed circuit board 1601.

FIG. 17 shows sections of the flexible printed circuit board 1601 taken along lines I—I, II—II and III—III in FIG. 16, respectively.

In FIGS. 16 and 17, reference numerals 1604*a* and 1604*b* denote AC input terminals, and 1604*c* and 1604*d* denote power supply terminals for the LED lamp module. Also, in FIG. 16, identical reference numerals are used to denote elements identical with or equivalent to those appearing in FIG. 15.

As seen from the figures, the flexible printed circuit board 1601, which is used as the circuit board, is bent into an S- or Z-shape as viewed in cross section (in the illustrated example, S-shape), thereby saving space and making it unnecessary to use jumper wires.

The AC input terminals 1604*a* and 1604*b* and the LED lamp module power supply terminals 1604*c* and 1604*d* (solder lands or pads on the board 1601) are positioned as illustrated in FIG. 17. The terminals may alternatively be positioned as shown in FIG. 18 or 19.

Specifically, the power supply terminals 1604*c* and 1604*d* for the LED lamp module 1503 are positioned close to the LED lamp module and at the same time are mounted on the opposite surfaces of the board 1601, as illustrated. Also, as shown in FIGS. 17 to 19, the AC input terminals 1604*b* and 1604*a* are arranged on the opposite surfaces of the board 1601 but at a distance from each other (above and below in the figures) in the longitudinal direction of the case 1502.

With this arrangement, a large creeping distance can be secured between the terminals 1604*a*, 1604*b*, 1604*c* and 1604*d*, especially between the AC input terminals 1604*a* and 1604*b* to which high voltage is applied, thus making it possible to ensure high insulating performance and also to improve the characteristics and reliability of the device.

In the first to third and fifth embodiments among the foregoing embodiments, DC input may be used in place of AC input, and also in this case the LED lamp 106 can be turned on.

Figure 20:
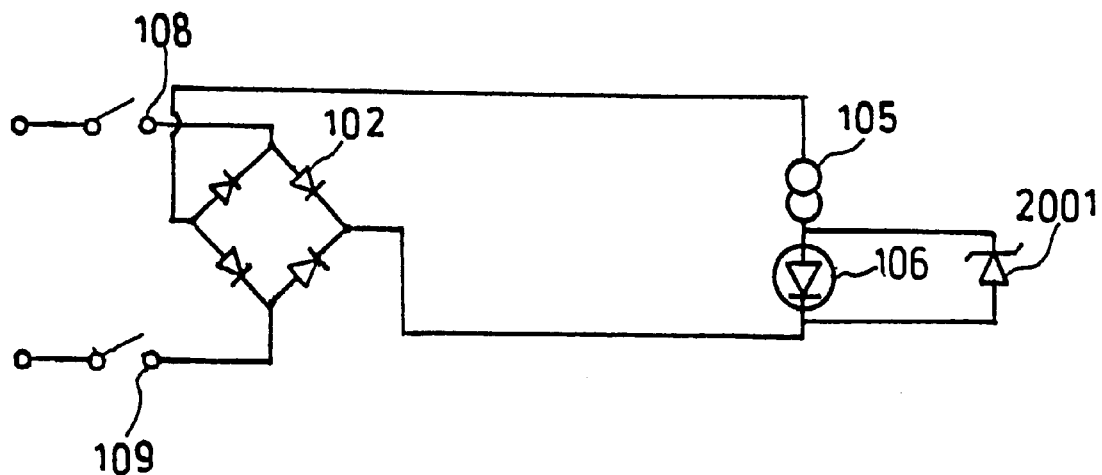
FIG. 20 is a circuit diagram showing a device according to a seventh embodiment of the present invention.
Figure 21:
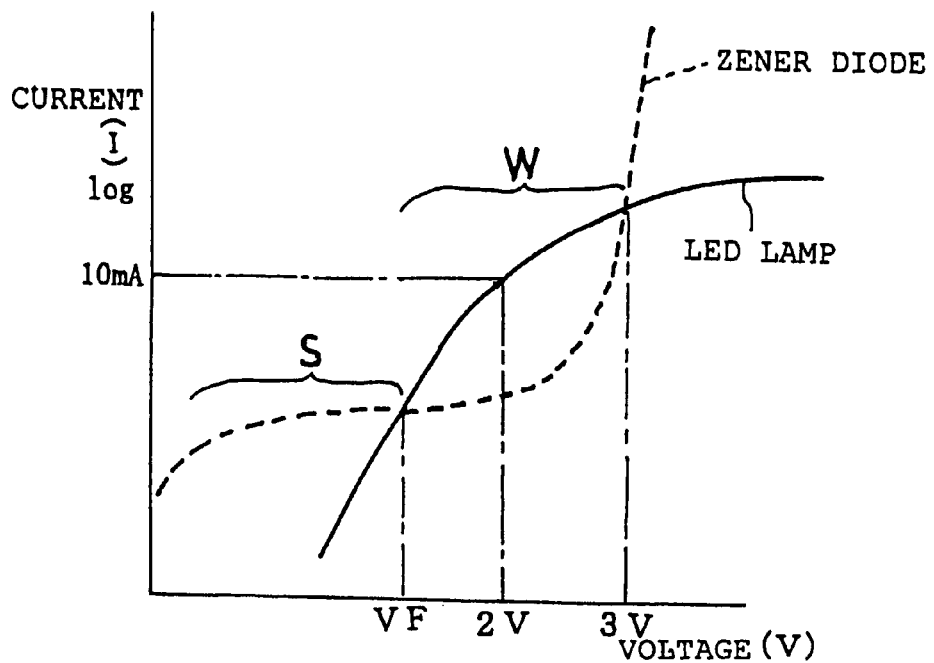
FIG. 21 is a graph showing current-voltage relationships of an LED lamp and a Zener diode in the seventh embodiment.
Figure 22:
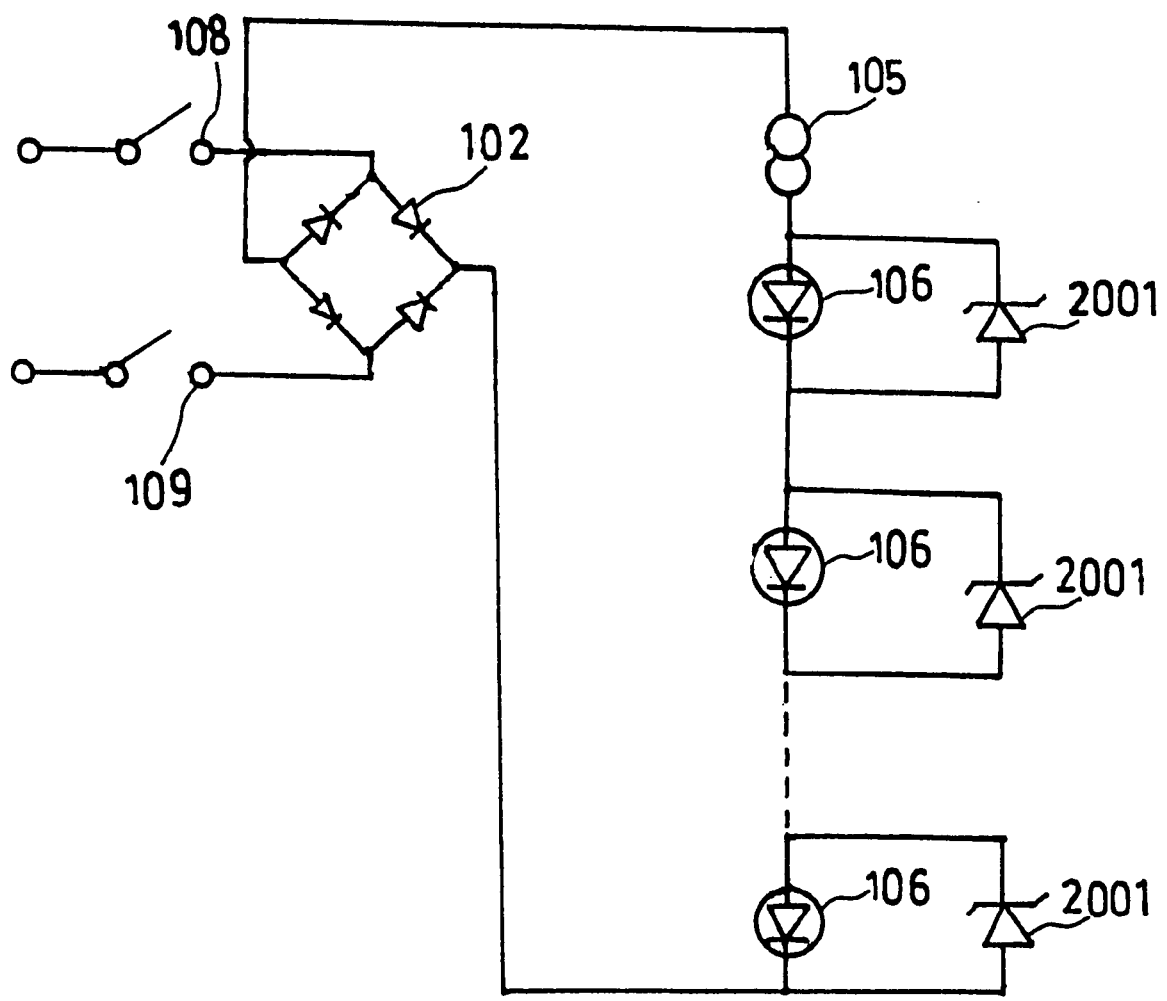
FIG. 22 is a circuit diagram showing a device according to an eighth embodiment of the present invention.
Figure 23:
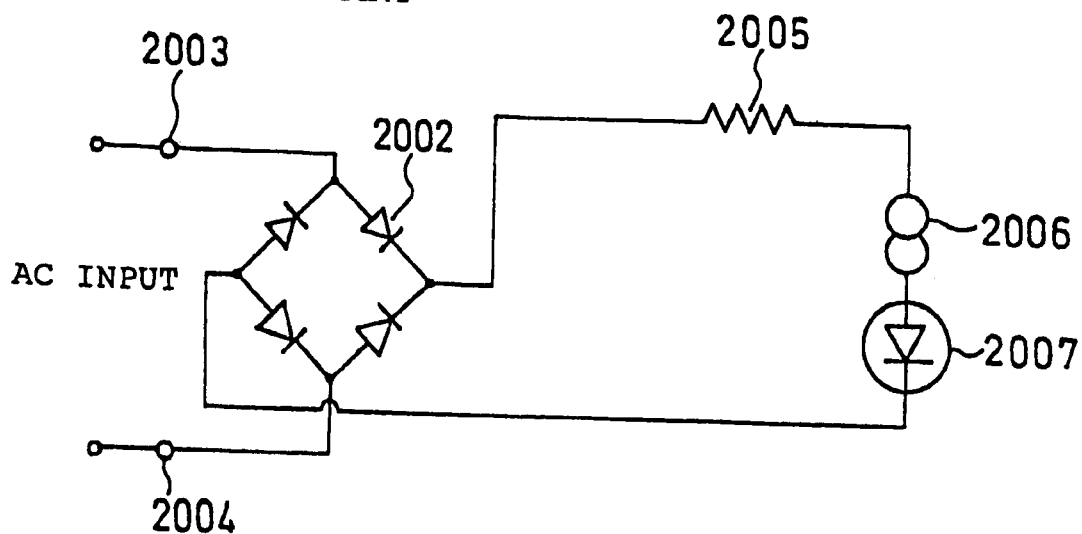
FIG. 23 is a circuit diagram showing a conventional device (Type 1)
Figure 24:
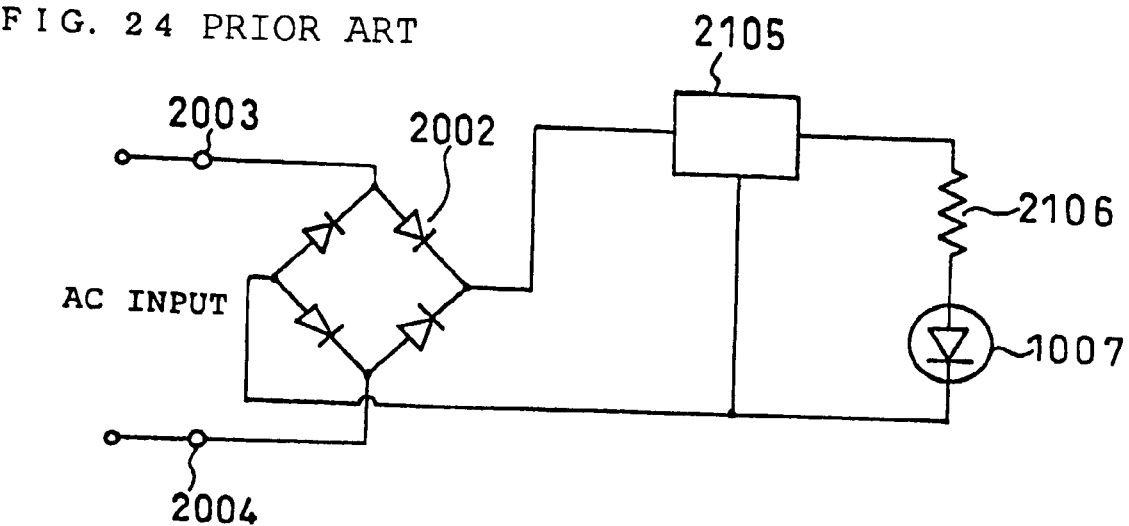
FIG. 24 is a circuit diagram showing another conventional device (Type 2).

Referring now to FIGS. 20 and 21, a seventh embodiment will be described. In the circuit diagram of FIG. 20 and the circuit diagram of FIG. 22 showing an eighth embodiment described later, identical reference numerals are used to denote elements identical with those of the first embodiment, and description of such elements is omitted.

As shown in FIG. 20, in the seventh embodiment, the constant-current element 105 and the LED lamp 106, which are connected in series, are connected to the full-wave rectifying diode bridge 102 which is connected between the AC input terminals 108 and 107, and a Zener diode 2001 is connected in parallel with the LED lamp 106.

In the seventh embodiment, while the voltage applied to the LED 106 is lower than a predetermined voltage $V_F$, current flows through the Zener diode 2001, so that the LED 106 is prevented from being lit dimly. Also, overcurrent is turned aside to the Zener diode 2001 and thus is prevented from flowing to the LED 106, whereby the LED 106 can be protected from such overcurrent.

Specifically, as seen from the current I-voltage V relationship of the LED lamp 106 and the Zener diode 2001 shown in FIG. 21, in a region S in which the voltage is lower than the forward voltage drop $V_F$ of the LED lamp 106, the LED lamp 106 normally does not turn on. Because of high impedance, however, a current of small amperage (e.g., 100 to 500 μA) can flow through the circuit even when the switches of the AC input terminals 108 and 107 are disconnected (OFF). Since such current is allowed to leak through the Zener diode 2001 in the constant current region S and does not flow through the LED lamp 106, the lamp is prevented from being lit dimly. In a voltage range W (e.g., from 2 V to 3 V) in which the voltage is higher than $V_F$ of the LED 106 and the current I is in the vicinity of 10 mA, the LED 106 turns on. If the current I exceeds the range W, such overcurrent flows through the Zener diode 2001. Thus, the LED 106 can be prevented from being lit dimly and also can be protected from overcurrent.

In the seventh embodiment, the Zener voltage of the Zener diode 2001 should preferably be higher than $V_F$ (forward voltage drop) of the LED lamp connected in parallel with the Zener diode within a range of from 10% to 30% both inclusive. If the difference between the Zener voltage and $V_F$ is smaller than 10%, dimming cannot be effectively prevented, and if the difference is greater than 30%, the LED lamp 106 cannot be fully protected from overcurrent.

FIG. 22 illustrates an eighth embodiment. In the eighth embodiment, a plurality of LED lamps 106 (each may be a unit including multiple LED chips) are connected in series, and a Zener diode 2001 is connected in parallel with each of the LED lamps 106. With the arrangement of the eighth embodiment, even if any of the LED lamps 106 burns out and thus turns off (circuit opens), current flows through the Zener diode 2001 connected in parallel with the burned-out lamp 106 while causing breakdown of the Zener diode, because of the provision of the constant-current element 105, so that the remaining LED lamps 106 can be kept turned on.

In other words, although the LED lamps 106 are connected in series, an advantage similar to that obtained in the case of the parallel connection of lamps can be achieved. Moreover, needless to say, the total electric power required for the series connection of the LED lamps 106 is smaller than in the case of the parallel connection of the lamps.

INDUSTRIAL APPLICABILITY

As seen from the above description, the present invention is useful as a device for indication or illumination, such as indicator lamps, fire hydrant lamps, emergency lamps, operation button lamps of ticket vending machines and other vending machines, elevators, etc., and also as a power supply unit for such lamps.

What is claimed is:

1. A power supply unit comprising:
    a rectifying diode bridge operable to obtain a rectified wave of a power supply voltage;
    an oscillator circuit;
    a clock signal control circuit; and
    a switched capacitor step-down circuit including a plurality of changeover switches connected in series and capable of being switched between two positions, and a capacitor connected between adjacent ones of said changeover switches, said changeover switches being capable of being switched to either of the two positions by said clock signal control circuit such that said capacitors are charged when said changeover switches are in one of the two positions and such that said capacitors are discharged when said changeover switches are in the other of the two positions, thereby supplying electric power to a load.

2. A power supply unit having two input terminals connected to an alternating-current power supply, for supplying electric power to a load connected to output terminals thereof, said power supply unit comprising:
    an oscillator circuit;
    a clock signal control circuit; and
    two switched capacitor step-down circuits, a high voltage-side input terminal of one of said two switched capacitor step-down circuits and a low voltage-side input terminal of the other of said two switched capacitor step-down circuits being connected to one of the two input terminals of said power supply unit, a low voltage-side input terminal of said one switched capacitor step-down circuit and a high voltage-side input terminal of said other switched capacitor step-down circuit being connected to the other of the two input terminals of said power supply unit.

3. An LED lamp device comprising:
    a power supply unit capable of being supplied with an alternating-current or direct-current power supply voltage; and
    an LED lamp including one or a plurality of serially connected LEDs connected to output terminals of said power supply unit,
    wherein said power supply unit includes a current detection circuit, an input voltage detecting section, an oscillator circuit, a switching circuit, and a switching element, said switching circuit being arranged so as to be supplied with signals from said current detection circuit and said input voltage detecting section to perform ON/OFF control of said switching element.

4. The LED lamp device according to claim 3, wherein said power supply unit is arranged so as to receive a rectified wave of the power supply voltage and is operable to admit electric power for only part of a time period in which a voltage of the rectified wave corresponding to each half period of a wave of the alternating-current power supply voltage is higher than or equal to a predetermined value and to use the electric power as power for lighting said LED lamp.

5. The LED lamp device according to claim 4, wherein said power supply unit is mounted on a flexible printed circuit board, said flexible printed circuit board having a generally S-shaped form.

6. The LED lamp device according to claim 5, wherein said power supply unit has terminals attached to opposite sides of the generally S-shaped form of said flexible printed circuit board and has two AC input terminals attached to opposite surfaces of said flexible printed circuit board.

7. The LED lamp device according to claim 6, wherein said power supply unit is operable to generate a pulsed current having a peak current value higher than a set average current value, and
    wherein the pulsed current having a frequency of not lower than 100 Hz.

8. An LED lamp device comprising:
a power supply unit capable of being supplied with alternating-current or direct-current power; and
an LED lamp including one or a plurality of serially connected LEDs connected to output terminals of said power supply unit,
wherein said power supply unit includes an input/output voltage detecting section, an oscillator circuit, a switching control circuit, a switching element, and a current detection circuit, said switching control circuit being arranged so as to be supplied with signals from said input/output voltage detecting section and said current detection circuit to perform ON/OFF control of said switching element.

9. The LED lamp device according to claim 8, wherein said power supply unit is mounted on a flexible printed circuit board, said flexible printed circuit board having a generally S-shaped form.

10. The LED lamp device claim 9, wherein said power supply unit has terminals attached to opposite sides of the generally S-shaped form of said flexible printed circuit board and has two AC input terminals attached to opposite surfaces of said flexible printed circuit board.

11. The LED lamp device according to claim 10, wherein said power supply unit is operable to generate a pulsed current having a peak current value higher than a set average current value, and
wherein the pulsed current having a frequency of not lower than 100 Hz.

12. An LED lamp device comprising:
a power supply unit capable of being supplied with alternating-current or direct-current power; and
an LED lamp including one or a plurality of serially connected LEDs connected to output terminals of said power supply unit,
wherein said power supply unit includes a rectifying diode bridge, a current detection circuit, an input voltage detecting section, an oscillator circuit, a switching circuit, and a switching element, said switching circuit being arranged so as to be supplied with signals from said current detection circuit and said input voltage detecting section to perform ON/OFF control of said switching element, and
wherein a capacitor is connected between said switching element and said LED lamp such that said capacitor is capable of being charged when said switching element is in an ON state and such that electric power is capable of being supplied to said LED lamp from said capacitor when said switching element is in an OFF state.

13. The LED lamp device according to claim 12, wherein said power supply unit is mounted on a flexible printed circuit board, said flexible printed circuit board having a generally S-shaped form.

14. The LED lamp device according to claim 13, wherein said power supply unit has terminals attached to opposite sides of the generally S-shaped form of said flexible printed circuit board and has two AC input terminals attached to opposite surfaces of said flexible printed circuit board.

15. The LED lamp device according to claim 14, wherein said power supply unit is operable to generate a pulsed current having a peak current value higher than a set average current value, and
wherein the pulsed current having a frequency of not lower than 100 Hz.

16. An LED lamp device comprising:
a power supply unit capable of being supplied with an alternating-current or direct-current power supply voltage; and
an LED lamp including one or a plurality of serially connected LEDs connected to output terminals of said power supply unit,
wherein said power supply unit includes a rectifying diode bridge operable to obtain a rectified wave of the power supply voltage, an oscillator circuit, a clock signal control circuit, and a switched capacitor step-down circuit,
wherein said switched capacitor step-down circuit includes a plurality of changeover switches connected in series and capable of being switched between two positions, and a capacitor connected between adjacent ones of said changeover switches, and
wherein said changeover switches are capable of being switched to either of the two positions by said clock signal control circuit such that said capacitors are capable of being charged when said changeover switches are in one of the two positions and such that said capacitors are capable of being discharged when said changeover switches are in the other of the two positions, thereby lighting said LED lamp.

17. The LED lamp device according to claim 16, wherein said power supply unit is mounted on a flexible printed circuit board, said flexible printed circuit board having a generally S-shaped form.

18. The LED lamp device according to claim 17, wherein said power supply unit has terminals attached to opposite sides of the generally S-shaped form of said flexible printed circuit board and has two AC input terminals attached to opposite surfaces of said flexible printed circuit board.

19. The LED lamp device according to claim 18, wherein said power supply unit is operable to generate a pulsed current having a peak current value higher than a set average current value, and
wherein the pulsed current having a frequency of not lower than 100 Hz.

20. An LED lamp device comprising:
a power supply unit capable of being supplied with alternating-current power; and
an LED lamp including one or a plurality of serially connected LEDs connected to output terminals of said power supply unit,
wherein said power supply unit includes an oscillator circuit, a clock signal control circuit, a current detection circuit, and two switched capacitor step-down circuits,
wherein a high voltage-side input terminal of one of said two switched capacitor step-down circuits and a low voltage-side input terminal of the other of said two switched capacitor step-down circuits are connected to one of two input terminals of said power supply unit, and
wherein a low voltage-side input terminal of said one switched capacitor step-down circuit and a high voltage-side input terminal of said other switched capacitor step-down circuit are connected to the other of the two input terminals of said power supply unit.

21. The LED lamp device according to claim 20, wherein said power supply unit is mounted on a flexible printed circuit board, said flexible printed circuit board having a generally S-shaped form.

22. The LED lamp device according to claim 21, wherein said power supply unit has terminals attached to opposite sides of the generally S-shaped form of said flexible printed circuit board and has two AC input terminals attached to opposite surfaces of said flexible printed circuit board.

23. The LED lamp device according to claim 22, wherein said power supply unit is operable to generate a pulsed current having a peak current value higher than a set average current value, and wherein the pulsed current having a frequency of not lower than 100 Hz.

24. An LED lamp device comprising:

a power supply unit supplied with an alternating-current power supply voltage; and an LED lamp including one or a plurality of serially connected LEDs connected to output terminals of said power supply unit, wherein said power supply unit is operable to obtain a rectified wave of the alternating-current power supply voltage, admit electric power for only part of a time period in which a voltage of the rectified wave corresponding to each half period of a wave of the alternating-current power supply voltage is higher than or equal to a predetermined value, and use the electric power as power for lighting said LED lamp, wherein said power supply unit is mounted on a flexible printed circuit board, said flexible printed circuit board having a generally S-shaped form, wherein said power supply unit has terminals attached to opposite sides of the generally S-shaped form of said flexible printed circuit board and has two AC input terminals attached to opposite surfaces of said flexible printed circuit board, wherein said power supply unit is operable to generate a pulsed current having a peak current value higher than a set average current value, and wherein the pulsed current has a frequency of not lower than 100 Hz.

25. An LED lamp device comprising:

a power supply unit capable of being supplied with alternating-current or direct-current power; and an LED lamp including a plurality of serially connected LEDs connected to output terminals of said power supply unit, wherein a Zener diode is connected in parallel with said one or plurality of LEDs, wherein a constant-current element is connected to said output terminals of said power supply unit in series with said plurality of LED lamps, and wherein said Zener diode has a Zener voltage higher than a forward voltage drop of said LED lamps connected in parallel with said Zener diode within a range of from 10% to 30% both inclusive.

* * * * *